United States Patent [19]
Ito et al.

[11] Patent Number: 5,805,485
[45] Date of Patent: Sep. 8, 1998

[54] ARITHMETIC UNIT AND METHOD FOR FOURIER TRANSFORM

[75] Inventors: Osamu Ito, Tokyo; Yasunari Ikeda, Kanagawa, both of Japan

[73] Assignee: Sony Corporation, Tokyo, Japan

[21] Appl. No.: 647,763

[22] Filed: May 15, 1996

[30] Foreign Application Priority Data

May 25, 1995 [JP] Japan ................................. 7-126228

[51] Int. Cl.⁶ ................................................ G06F 17/14
[52] U.S. Cl. ................................ 364/726.04; 364/726.07
[58] Field of Search ........................ 364/726.04, 726.07, 364/726.02

[56] References Cited

U.S. PATENT DOCUMENTS

| | | | |
|---|---|---|---|
| 3,702,393 | 11/1972 | Fuss | 364/726.04 |
| 3,892,956 | 7/1975 | Fuss | 364/726.04 |
| 4,058,715 | 11/1977 | Niwa | 364/726 |
| 4,534,069 | 8/1985 | McGee | 364/726.04 |
| 5,117,381 | 5/1992 | Juri et al. | 364/726.07 |
| 5,293,330 | 3/1994 | Sayegh | 364/726 |
| 5,365,470 | 11/1994 | Smith | 364/726.04 |

OTHER PUBLICATIONS

Bidet et al., "A Fast Single–Chip Implementation of 8192 Complex Point FFT"; IEE of Solid Date Circuits, vol. 30, No. 3, Mar. 1995, pp. 1666–1668.

Antola, "Multiple–Transform Pipelines for Image Coding: Structural Definition"; Signal Processing IV: 1988, pp. 1665–1668.

*Primary Examiner*—David H. Malzahn
*Attorney, Agent, or Firm*—Jay H. Maioli

[57] ABSTRACT

A Fourier transform arithmetic unit which is reduced in cost and size by simplifying the configuration of a butterfly operation device. Data corresponding to each of the unit symbols is divided into first-half data and second-half data by a distribution switch. The first-half data is supplied to a delay circuit to be delayed by N/2. The data delayed by this delay circuit is again supplied to this delay circuit. The second-half data is supplied to another delay circuit to be delayed by N/2. The delayed data is again supplied to this delay circuit to be delayed. In this manner, the first-half data and the second-half data are supplied two times to the input terminals of the butterfly operation device. The butterfly operation device performs one of two butterfly operations (addition) at the time of the first input and performs the other butterfly operation (subtraction) at the time of the second input. That is, the butterfly operation device performs the butterfly operations in a time division manner.

14 Claims, 14 Drawing Sheets

FIG.2(A) INPUT

| $f_0$ | $f_1$ | $g_0$ | $g_1$ | $h_0$ | $h_1$ |

|←ONE SYMBOL→|

FIG.2(B) DISTRIBUTION SWITCH 31-1 FIRST OUTPUT

| $f_0$ | | $g_0$ | | $h_0$ | |

FIG.2(C) DISTRIBUTION SWITCH 31-1 SECOND OUTPUT

| | $f_1$ | | $g_1$ | | $h_1$ |

FIG.2(D) DELAY CIRCUIT 32A-1 WRITE / READ

| $f_0$ | $f_0$ | $g_0$ | $g_0$ | $h_0$ | $h_0$ |
| $f_0$ | $f_0$ | $g_0$ | $g_0$ | $h_0$ | $h_0$ |

FIG.2(E) DELAY CIRCUIT 32B-1 WRITE / READ

| $f_1$ | $f_1$ | $g_1$ | $g_1$ | $h_1$ | $h_1$ |
| $f_1$ | $f_1$ | $g_1$ | $g_1$ | $h_1$ | $h_1$ |

FIG.2(F) BUTTERFLY OPERATION DEVICE 34-1

| $f_0+f_1$ | $f_0-f_1$ | $g_0+g_1$ | $g_0-g_1$ | $h_0+h_1$ |

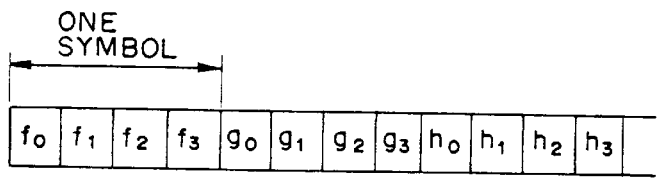
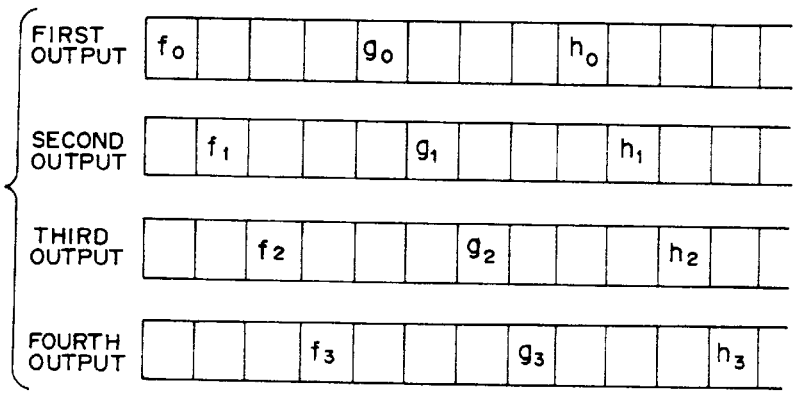
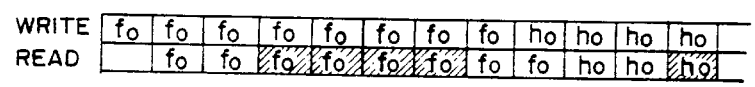
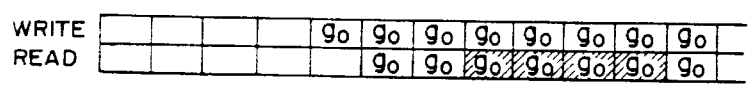
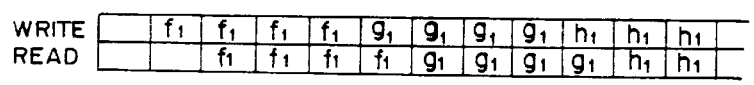
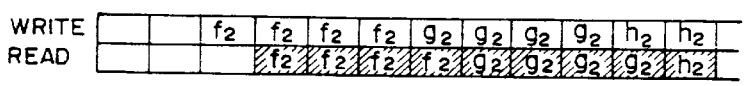
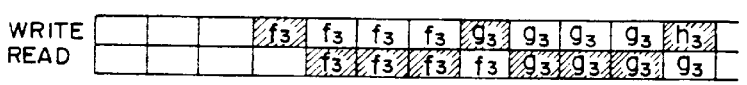
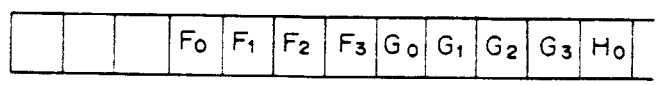

ARITHMETIC UNIT AND METHOD FOR FOURIER TRANSFORM

BACKGROUND OF THE INVENTION

1. Field of the Invention

The present invention relates to an arithmetic unit and a method for Fourier transform and, more particularly, to an arithmetic unit and a method enabling Fourier transform using a simpler arrangement of butterfly operations.

2. Description of the Related Art

Conventionally, high-speed Fourier transform is performed by using a software means, i.e., programmed operation of a digital signal processor (DSP). However, since such a software means requires a long processing time, IC chips (special hardware) for performing arithmetic processing for high-speed Fourier transform have recently been brought to use.

Such hardware means are arranged in such a manner that one butterfly operation circuit is repeatedly used or a plurality of butterfly operation circuits are arranged in parallel with each other.

If operations are performed by one butterfly operation circuit, a memory (RAM) for storing input data successively processed and a multiplying clock for performing arithmetic processing at a high speed are required.

In the case where a plurality of butterfly operation circuits are used, a plurality of RAMs for storing intermediate operation results are required.

If the number N of points of Fourier transform is thereby increased, the circuit scale is increased and a need for external IC chips and a high-speed multiplying clock arises, so that it is difficult for the entire system to be formed in one IC chip.

Then, processing data in a pipeline processing manner as shown in FIG. 11, for example, may be taken into consideration. In the example shown in FIG. 11, input data is divided into two groups of data: one corresponding to the first half of one symbol (data supplied precedently with respect to time) and the other corresponding to the second half (data supplied by being delayed) by a distribution switch 1 of a processing circuit forming a first processing stage. The first-half data is supplied to a delay circuit 2 which delays data by an amount of time corresponding to N/2 (N: the number of data items (number of points) of one symbol). After being delayed by N/2, the data is supplied to one (first) input of terminal (shown as an upper input terminal in FIG. 11) of a butterfly operation device 4.

The second-half data separated by the distribution switch 1 is supplied to a multiplier 3 for the twiddle factors which performs multiplication using complex coefficients stored in a memory such as a ROM (not shown). After undergoing multiplication for the twiddle factors in the multiplier 3, the data is supplied to the other (second) input terminal (shown as a lower input terminal in FIG. 11) of the butterfly operation device 4. The butterfly operation device 4 performs butterfly operation of the two inputs and outputs the result of the operation to a processing circuit forming a subsequent stage (second-stage).

In the second-stage processing circuit, the data output from one (first) output terminal (upper output terminal in FIG. 11) of the first-stage butterfly operation device 4 is supplied to one (first) input terminal (shown as an upper input terminal in FIG. 11) of a changing switch 6-1 while the data output from the other (second) output terminal (lower output terminal in FIG. 11) of the butterfly operation device 4 is delayed by N/4 by a delay circuit 5-1 and then supplied to the other (second) input terminal (shown as a lower input terminal in FIG. 11) of the changing switch 6-1. The changing switch 6-1 suitably changes the data input through its two input terminals and outputs the changed data through its two output terminals.

The data output from one (first) output terminal of the changing switch 6-1 is delayed by N/4 by a delay circuit 7-1 and then supplied to one (first) input terminal of a butterfly operation device 9-1. On the other hand, the data output from the other (second) output terminal of the changing switch 6-1 undergoes multiplication for the twiddle factors in a multiplier 8-1 for the twiddle factors and is then supplied to the other (second) input terminal of the butterfly operation device 9-1. The butterfly operation device 9-1 performs a butterfly operation of the data input through its two input terminals and outputs the result of the operation through its two output terminals.

Third-stage and other subsequent processing circuits have the same configuration as the second-stage processing circuit. However, the delay time of delay circuits 5-i and 7-i in the processing circuit forming each intermediate stage is ½ of that in the processing circuit forming the preceding stage.

In the processing circuit forming a stage which is subsequent to the stage in which the delay time of delay circuits 5-k and 7-k is 1 in terms of the number of data items, the data output from one (first) output terminal of butterfly operation device 9-k of the processing circuit forming the preceding stage is supplied directly to one (first) input terminal of a change-over switch 11 while data output from the other (second) output terminal of butterfly operation device 9-k is delayed by N/2 by a delay circuit 10A and then supplied to the other input terminal of the change-over switch 11. The change-over switch 11 is arranged to change the data input through the two input terminals into data in serial form and to output this data, and the output from the change-over switch 11 is rearranged by a rearrangement circuit 12.

Actually, a butterfly operation is achieved by performing both the processing of the butterfly operation device 4 and the processing of the multiplier 3 for the twiddle factors in the first-stage processing circuit, for example. In this specification, for ease of description, processing including no multiplication for the twiddle factors is referred to as, a butterfly operation (butterfly operation in a narrow sense).

The operation of this processing system will next be described. The distribution switch 1 divides each of a series of data input with respect to unit symbols into first-half data (half data supplied precedently with respect to time) and second-half data (half data supplied after with respect to time). The distribution switch 1 supplies the first-half data to the delay circuit 2 and supplies the second-half data to the multiplier 3 for the twiddle factors. The delay circuit 2 delays the input first-half data by N/2 (i.e., an amount corresponding to half data of one symbol) and supplies the delayed data to one of the two input terminals of the butterfly operation device 4.

At this time, the second-half data, having being output from the distribution switch 1 and having undergone multiplication for the twiddle factors in the multiplier 3, is supplied to the other input terminal of the butterfly operation device 4. (The multiplication time of the multiplier 3 for the twiddle factors has been ignored. If this multiplication time is not negligible, the delay time of the delay circuit 2 is set by also considering this multiplication time. Time setting is also made in the same manner with respect to the other delay circuits.). That is, by virtue of the delay circuit 2, the first-half data and the second half-data of the same symbol are supplied to the butterfly operation device 4 by the same timing to be input thereto simultaneously with each other (the items of each of the first-half data and second-half data being input one by one in order from the leading item). The butterfly operation device 4 performs a radix-2 butterfly operation with respect to corresponding data items of the two groups of input data.

FIG. 12 shows the principle of a radix-2 butterfly operation. In the example of an operation shown in FIG. 12, the number N of data items of one symbol is 16.

That is, the butterfly operation device 4 adds the first one of the first-half data items represented by numbers 0 to 7, i.e., data item 0, and the first one of the second-half data items represented by numbers 8 to 15, i.e., data item 8, in sixteen data items constituting a symbol g and represented by numbers 0 to 15 in FIG. 12. The butterfly operation device 4 also performs subtraction between the data items 0 and 8. The value obtained by the addition is set as data item 0 in a column p shown in FIG. 12 while the value obtained by the subtraction is set as a data item 8 in column p.

Next, the sum and the difference between the second one of the first-half data items of the symbol g, i.e., data item 1, and the second one of the second-half data items of the symbol g, i.e., data item 9, are calculated. The sum is set as data item 1 in column p while the difference is set as data item 9 in column p. The subsequent data items are processed in the same manner. Thus, sixteen data items represented by numbers 0 to 15 in column p are obtained. The group of eight data items in the first half of column p, represented by numbers 0 to 7, and the group of eight data items in the second half of column p, represented by numbers 8 to 15, are supplied in parallel with each other to the processing circuit forming the subsequent stage, each group of data items being sent in serial order.

In the second-stage processing circuit, eight data items 0 to 7 in the first half of column p, output from the first-stage butterfly operation device 4, are supplied directly to one of the two input terminals of the changing switch 6-1 while eight data items 8 to 15 in the second half are input to the delay circuit 5-1. The data items input to the delay circuit 5-1 are delayed by N/4 (i.e., an amount corresponding to a quarter of the symbol) and then supplied to the other input terminal of the changing switch 6-1.

The changing switch 6-1 executes processing for suitably changing the data items supplied to the two input terminals shown as upper and lower terminals in FIG. 11.

That is, as shown in FIG. 12, first-half four data items 0 to 3 in column-p data items 0 to 7 supplied through the upper input terminal are supplied to the delay circuit 7-1. Following second-half four data items 4 to 7 in column-p data items 0 to 7 are output to the multiplier 8-1 for the twiddle factors. Four column-p data items 8 to 11 which are supplied to the lower input terminal of the changing switch 6-1 when four column-p data items 4 to 7 are supplied to the upper input terminal of the changing switch 6-1 are supplied to the delay circuit 7-1. Four column-p data items 12 to 15, input subsequently, are supplied to the multiplier 8-1 for the twiddle factors.

That is, data items 0 to 3 and 8 to 11 are successively output from the first output terminal of the changing switch 6-1 while data items 4 to 7 and 12 to 15 are successively output from the second output terminal.

The delay circuit 7-1 delays four input column-p data items 0 to 3 by N/4 and supplies these data items to one of the two input terminals of the butterfly operation device 9-1.

At this time, four data items 4 to 7 which have undergone multiplication for the twiddle factors in the multiplier 8-1 are supplied to the other input terminal of the butterfly operation device 9-1. That is, by virtue of the delay circuit 7-1, data items 0 to 3 and data items 4 to 7 are supplied to the butterfly operation device 9-1 by the same timing to be input thereto simultaneously with each other.

The butterfly operation device 9-1 calculates the sum and difference between column-p data items 0 and 4, sets the sum as data item 0 in column q and sets the difference as data item 4 in column q. The butterfly operation device 9-1 also calculates the sum and difference between column-p data items 1 and 5, sets the sum as data item 1 in column q and sets the difference as data item 5 in column q. The same processing is repeated to obtain eight column-q data items 0 to 7 from column-p data items 0 to 7.

After delaying four input column-p data items 0 to 3 by N/4, the delay circuit 7-1 delays four subsequently-input data items 8 to 11 by N/4 and supplies these data items to the above-mentioned one input terminal of the butterfly operation device 9-1. At this time, four data items 12 to 15 which have undergone multiplication for the twiddle factors in the multiplier 8-1 are supplied to the other input terminal of the butterfly operation device 9-1. That is, four data items 8 to 11 and four data items 12 to 15 are supplied to the two input terminals of the butterfly operation device 9-1 by the same timing to be input thereto simultaneously with each other.

The butterfly operation device 9-1 calculates the sum and difference between column-p data items 8 and 12, sets the sum as data item 8 in column q and sets the difference as data item 12 in column q. The butterfly operation device 9-1 also calculates the sum and difference between column-p data items 9 and 13, sets the sum as data item 9 in column q and sets the difference as data item 13 in column q.

The subsequent column-p data items are processed in the same manner. Thus, eight column-q data items 8 to 15 are obtained from eight column-p data items 8 to 15.

Column-q data items 0 to 7 and 8 to 15 output from the second-stage butterfly operation device 9-1 are input to the third-stage processing circuit in parallel with each other.

Similar processing is subsequently performed in the third-stage and subsequent processing circuits.

Of the data processed by the butterfly operation device 9-k in the processing circuit forming the stage including the delay circuits 5-k and 7-k for delaying data by an amount corresponding to one data item, the data output from the upper output terminal of the butterfly operation device 9-k as shown in FIG. 11 is supplied to the upper input terminal of the change-over switch 11 while the data output from the lower output terminal of the butterfly operation device 9-k is delayed by N/2 by the delay circuit 10A and then supplied to the lower input terminal of the change-over switch 11.

The change-over switch 11 first selects and outputs data items 0, 2, 4, 6, 8, 10, 12, and 14 in column G shown in FIG. 12, which are supplied to the upper input terminal. The change-over switch 11 next selects and outputs data items 1, 3, 5, 7, 9, 11, 13, and 15 in column G, which are input from the delay circuit 10A. The rearrangement circuit 12 rearranges these data items into a sequence, e.g., 0. 8, 4, 12, 2, 10, 6, 14, 1, 9, 5, 13, 3, 11, 7, 15 (by so-called bit reverse processing mentioned below in the description of an embodiment of the present invention) and outputs this sequence of data items.

The above-described sequence of operation is repeated. Thus, serial data input to the distribution switch 1 is successively processed in a pipeline processing manner through the processing stages by being divided into groups of data items processed in parallel with each other, and the processed data items are again changed into serial data by the change-over switch 11. This serial data is output at the same clock rate as the serial data input to the distribution switch 1.

The distribution switch 1, the changing switch 6-1 to 6-k and the change-over switch 11 in the processing stages are controlled by predetermined timing by a timing control circuit (not shown).

The number of delay circuits required in this example is 2(N−1).

In the example shown in FIG. 11, the multiplier 8-i for the twiddle factors (multiplier 3) in each stage is inserted between the lower output terminal of the changing switch 6-i (distribution switch 1) and the lower input terminal of the butterfly operation device 9-i (butterfly operation device 4), as shown in FIG. 13. Alternatively, it may be connected to the lower output terminal of the butterfly operation device 9-i, as shown in FIG. 14.

Further, the multiplier 8-i for the twiddle factors may alternatively be inserted between the delay circuit 5-i and the lower input terminal of the changing switch 6-i. In each case, the same operation result can be obtained as in the case of using the arrangement shown in FIG. 13. However, multiplying values of multiplication for the twiddle factors are changed according to the inserted position.

FIG. 16 shows an example of a radix-4 butterfly operation relating to a radix-2 butterfly operation of the processing system shown in FIG. 11. In this example, a first-stage distribution switch 11 divides data of each of input symbols into quarters and outputs the divided data items. The first quarter of the data is delayed by N/4 by each of the delay circuits 12A, 12B, and 12C, that is, delayed by 3N/4 in total and then supplied to a first input terminal of a butterfly operation device 14. The second quarter of the data is delayed by N/4 by each of the delay circuits 12D and 12E, that is, delayed by N/2 in total and then input to a multiplier 13A for the twiddle factors. The multiplier 13A multiplies the input data by complex coefficients stored in a memory such as a ROM (not shown) and supplies the result of this multiplication to a second input terminal of the butterfly operation device 14.

The third quarter of the data output from the distribution switch 11 is delayed by N/4 by a delay circuit 12F and then input to a multiplier 13B for the twiddle factors. The multiplier 13B performs multiplication of the input data with respect to the twiddle factors and supplies the result of this multiplication to a third input terminal of the butterfly operation device 14. The fourth quarter of the data output from the distribution switch 11 undergoes multiplication for the twiddle factors performed by a multiplier 13C for the twiddle factors and is then supplied to a fourth input terminal of the butterfly operation device 14.

The butterfly operation device 14 performs a butterfly operation of the groups of data input through the four input terminals and successively outputs each of the four parallel groups of data to a second-stage processing circuit.

In the second-stage processing circuit, the data output from a first output terminal of the first-stage butterfly operation device 14 is input directly to a first input terminal of a changing switch 16-1. The data output from a second output terminal of the butterfly operation device 14 is delayed by N/16 by a delay circuit 15F-1 and then supplied to a second input terminal of the changing switch 16-1. The data output from a third output terminal of the butterfly operation device 14 is delayed by N/16 by each of the delay circuits 15D-1 and 15E-1, that is, delayed by N/8 in total and then supplied to a third input terminal of the changing switch 16-1. The data output from a fourth output terminal of the butterfly operation device 14 is delayed by N/16 by each of the delay circuits 15A-1, 15B-1, and 15C-1, that is, delayed by 3N/16 in total and then supplied to a fourth input terminal of the changing switch 16-1.

The changing switch 16-1 suitably selects data items input through its four input terminals and outputs the selected data items through its four output terminals.

The data output from the first output terminal of the changing switch 16-1 is delayed by N/16 by each of the delay circuits 17A-1, 17B-1, and 17C-1, that is, delayed by 3N/16 in total and then supplied to a first input terminal of a butterfly operation device 19-1. The data output from the second output terminal of the changing switch 16-1 is delayed by N/16 by each of the delay circuits 17D-1 and 17E-1, that is, delayed by N/8 in total and then input to a multiplier 18A-1 for the twiddle factors. The multiplier 18A-1 performs multiplication of the input data with respect to the twiddle factors and supplies the result of this multiplication to a second input terminal of the butterfly operation device 19-1.

The data output from the third output terminal of the changing switch 16-1 is delayed by N/16 by a delay circuit 17F-1 and then input to a multiplier 18B-1 for the twiddle factors. The multiplier 18B-1 performs multiplication of the input data with respect to the twiddle factors and supplies the result of this multiplication to a third input terminal of the butterfly operation device 19-1. The data output from the fourth output terminal of the changing switch 16-1 undergoes multiplication for the twiddle factors performed by a multiplier 18C-1 for the twiddle factors and is then supplied to a fourth input terminal of the butterfly operation device 19-1.

Similar processing is performed in each of subsequent stages to successively process the data. In the example shown in FIG. 11, the delay time of the delay circuits in each stage is ½ of that of the delay circuits in the preceding stage. In contrast, in this example, the delay time of each stage is ¼ of that of the preceding stage.

The data output from each of the first to fourth output terminals of a butterfly operation device 19-k in a stage in which the delay time of delay circuits corresponds to one data item is supplied to the corresponding one of the first to fourth input terminals of a change-over switch 21 directly or after being delayed by N/4 by a delay circuit 20F, delay circuits 20D and 20E or delay circuits 20A to 20C. The change-over switch 21 suitably selects data items input through the first to fourth terminals in parallel with each other and outputs the selected data items as serial data. A rearrangement circuit 22 rearranges outputs from the change-over switch 11 and outputs rearranged data.

The operation of this processing system will next be described. The distribution switch 11 divides each of the series of data input with respect to unit symbols into four groups and outputs the divided groups of data through the first to fourth output terminals. For example, if one symbol is constituted of 16 data items as shown in FIG. 17, four data items of symbol g represented by numbers 0 to 3 are output through the first terminal; four data items represented by numbers 4 to 7, through the second output terminal; four data items represented by numbers 8 to 11, through the third output terminal; and four data items represented by numbers 12 to 15, through the fourth output terminal.

Four data items 0 to 3 ahead of the others with respect to time are delayed by a total of 3N/4 by the delay circuits 12A, 12B, and 12C and supplied to the first input terminal of the butterfly operation device 14. Four data items 4 to 7 are delayed by a total of N/2 by the delay circuits 12D and 12E, then undergo multiplication for the twiddle factors in the multiplier 13A for the twiddle factors, and are supplied to the second input terminal of the butterfly operation device 14.

Four data items 8 to 11 are delayed by N/4 by the delay circuit 12F and then input to the multiplier 13B for the twiddle factors. These data items are supplied to the third input terminal of the butterfly operation device 14 after undergoing multiplication for the twiddle factors. Four data items 12 to 15 undergo multiplication for the twiddle factors in the multiplier 13C for the twiddle factors and are thereafter supplied to the fourth input terminal of the butterfly operation device 14. Thus, the groups of four data items are respectively supplied to the four input terminals of the butterfly operation device 14 by the same timing to be input thereto simultaneously with each other, the data items in each group being input in serial order.

The butterfly operation device 14 performs butterfly operation of data items 0, 4, 8, and 12 respectively input from the four input terminals, as shown in FIG. 17. As a result of this operation, data items 0, 4, 8, and 12 in column p shown in FIG. 17 are set.

Next, a butterfly operation of data items 1, 5, 9, and 13 of symbol g are performed to set data items 1, 5, 9, and 13 in column p.

The subsequent data items of symbol g are processed in the same manner. Thus, sixteen data items in column p are calculated from the sixteen data items of symbol g. These operation results are output to the second-stage processing circuit.

In the second processing circuit, p-column data items 0 to 3 are supplied to the first terminal of the changing switch 16-1, and column-p data items 4 to 7 are delayed by N/16 by the delay circuit 15F-1 and then supplied to the second input terminal. Data items 8 to 11 are delayed by a total of N/8 by the delay circuits 15D-1 and 15E-1 and then supplied to the third input terminal. Data items 12 to 15 are delayed by a total of 3N/16 by the delay circuits 15A-1, 15B-1, and 15C-1 and then supplied to the fourth input terminal.

The changing switch 16-1 first selects column-p data item 0 output from the first output terminal of the butterfly operation device 14 and input through the first input terminal of the changing switch 16-1, and outputs this data item through the first output terminal. Data item 0 output from the first output terminal of the changing switch 16-1 is delayed by 3N/16 by the delay circuits 17A-1, 17B-1, and 17C-1 and then supplied to the first input terminal of the butterfly operation device 19-1.

At the next input time, data items 1 and 4 are respectively supplied to the first input terminal and the second input terminal of the changing switch 16-1. Data item 1 is output through the second output terminal while data item 4 is output through the first output terminal.

Similarly, data items 2, 5, and 8 supplied next time are output through the third, second and first output terminals, respectively; data items 3, 6, 9, and 12 are output through the fourth, third, second and first output terminals, respectively; data items 7, 10, and 13 are output through the fourth, third and second output terminals, respectively; data items 11 and 14 are output through the fourth and third output terminals, respectively; and data item 15 is output through the fourth output terminal.

Column-p data items 0, 4, 8, and 12 output through the first output terminal are delayed by a total of 3N/16 by the delay circuits 17A-1, 17B-1, and 17C-1, and are then supplied to the first input terminal of the butterfly operation device 19-1.

Column-p data items 1, 5, 9, and 13 output through the second output terminal are delayed by N/8 by the delay circuits 17D-1 and 17E-1, thereafter undergo multiplication for the twiddle factors performed by the multiplier 18A-1 for the twiddle factors, and are then supplied to the second input terminal of the butterfly operation device 19-1.

Column-p data items 2, 6, 10, and 14 output through the third output terminal are delayed by N/16 by the delay circuit 17F-1, thereafter undergo multiplication for the twiddle factors performed by the multiplier 18B-1 for the twiddle factors, and are then supplied to the third input terminal of the butterfly operation device 19-1. Column-p data items 3, 7, 11, and 15 output through the fourth output terminal undergo multiplication for the twiddle factors performed by the multiplier 18C-1 for the twiddle factors, and are supplied to the fourth input terminal of the butterfly operation device 19-1.

As described above, column-p data items 0 to 3 are respectively supplied to the first to fourth input terminals of the butterfly operation device 19-1 by the same timing to be input thereto simultaneously with each other. The butterfly operation device 19-1 performs butterfly operation of these four data items to form data items 0 to 3 in column G.

Similarly, when data items 4 and 7 are input to the butterfly operation device 19-1, four data items are output from the butterfly operation device 19-1 as data items 4 to 7 in column G. Also, when data items 8 and 11 or 12 to 15 are input, items 8 to 11 or 12 to 15 in column G shown in FIG. 17 are obtained from the first to fourth output terminals of the butterfly operation device 19-1.

If the number of data items of one symbol is sixteen, the operation of the butterfly operation devices is completed by the above-described processing. If the number of data items of one symbol is larger than sixteen, the same processing is performed in other one or more subsequent processing circuits.

Of the four column-G data items 0 to 4 with which a butterfly operation has been completed, data item 0 is supplied to the first input terminal of the change-over switch 21 without being delayed. Data item 1 is delayed by N/4 by the delay circuit 20F, data item 2 is delayed by N/2 by the delay circuit 20D and 20E and data item 3 is delayed by 3N/4 by the delay circuits 20A, 20B, and 20C before they are respectively supplied to the second to third input terminals of the change-over switch 21.

The change-over switch 21 selects and outputs data items 0, 4, 8, and 12 input through the first input terminal in the first period of N/4 and selects and outputs data items 1, 5, 9, and 13 input through the second input terminal in the next N/4 period. In the subsequent periods, the change-over switch 21 selects and outputs data items 2, 6, 10, and 14 input through the second input terminal and data items 3, 7, 11, and 15 input through the third input terminal.

By repeating this operation, the data items are output in serial form and are rearranged in the order from 0 to 15 in the rearrangement circuit 22.

In the case of the system shown in FIG. 11, in which the radix is 2, the number of delay circuits is 2(N−1). In the case of the system shown in FIG. 16, in which the radix is 4, the number of delay circuits is 4(N−1). (If the radix is R, the number of delay circuits is R(N−1).

In either example, the position of the multipliers for the twiddle factors is not restricted and there is no limit to the radix of fast Fourier transform. Further, there is no restriction on setting the amount of delay. In each of the above-described examples, series of data are input to or output from each stage in parallel with each other.

Thus, in the conventional Fourier transform arithmetic unit, a plurality of operations are performed by each butterfly operation device at a time. Accordingly, the construction of each butterfly operation device is complicated, so that the overall size of the arithmetic unit is large and the cost for manufacturing the arithmetic unit is high.

SUMMARY OF THE INVENTION

In view of these circumstances, an object of the present invention is to provide an arithmetic unit and a method which enable Fourier transform using simpler butterfly operation devices such that the size and the manufacturing cost of the arithmetic unit are reduced.

To achieve this object, according to one aspect of the present invention, there is provided a Fourier transform arithmetic unit comprising a plurality of processing stages for performing fast Fourier transform by pipeline processing, each of the plurality of processing stages having timing control means for dividing input data corresponding to one symbol into a plurality of groups of data and for outputting the plurality of divided groups of data a certain number of times by the same timing, and first operation means supplied with the plurality of groups of data output a certain number of times by the same timing by the timing control means, the first operation means performing predetermined operation each time the plurality of groups of data are input, the first operation means outputting a result of butterfly operation in a time division manner.

According to another aspect of the present invention, there is provided a Fourier transform operation method of performing fast Fourier transform by pipeline processing using a plurality of processing stages, the method comprising, in each of the plurality of processing stages, a first step of dividing input data corresponding to one symbol into a plurality of groups of data, a second step of outputting the plurality of divided groups of data a certain number of times by the same timing, and a third step of performing predetermined operation each time the plurality of groups of data are supplied by the same timing, and outputting a result of butterfly operation in a time division manner.

BRIEF DESCRIPTION OF THE DRAWINGS

FIG. 2 is a diagram of the operation of the embodiment shown in FIG. 1;

FIG. 4 is a diagram of the operation of the embodiment shown in FIG. 3;

DESCRIPTION OF THE PREFERRED EMBODIMENTS

Figure 1:
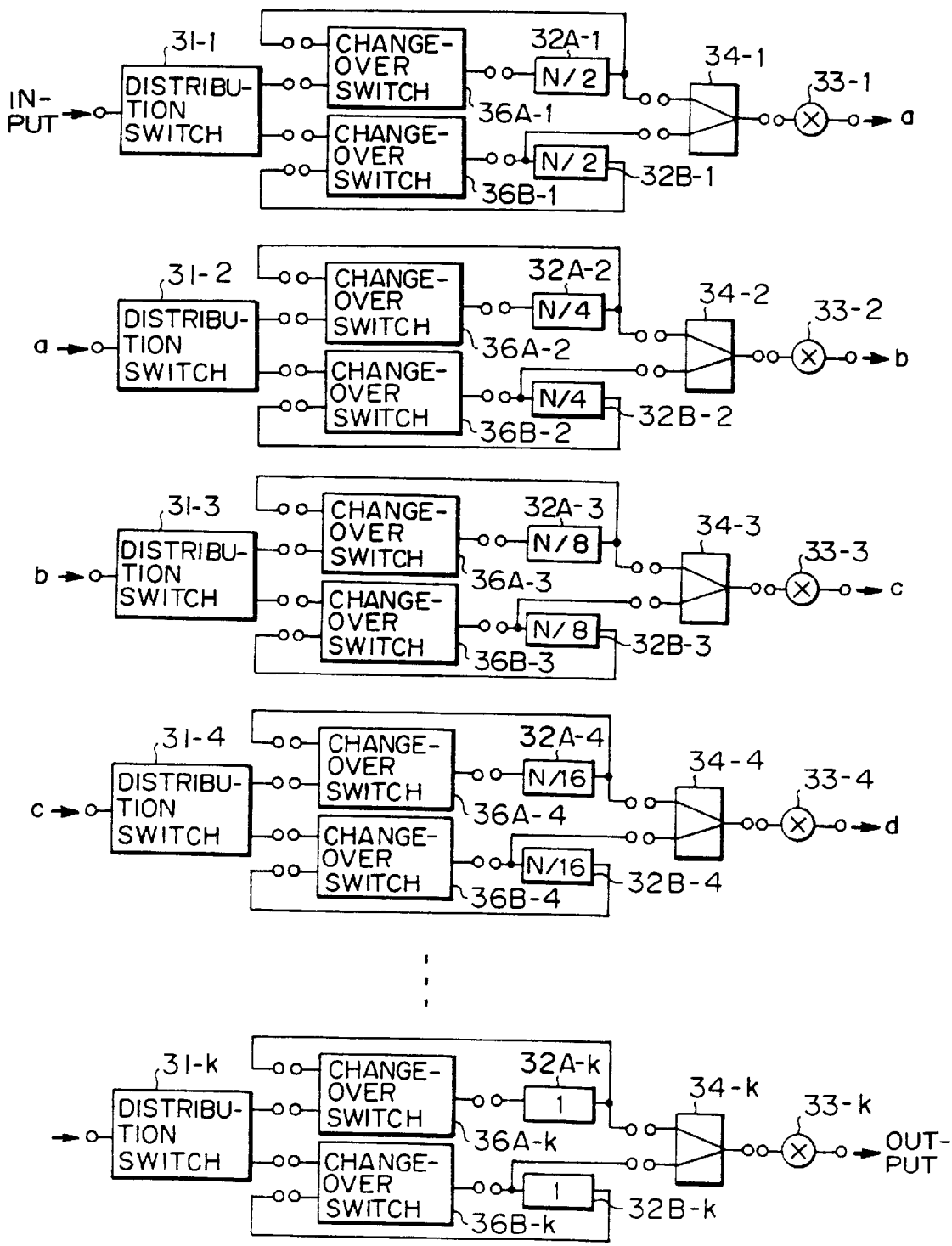
FIG. 1 is a block diagram showing the configuration of a first embodiment of a Fourier transform arithmetic unit in accordance with the present invention.

FIG. 1 is a block diagram showing the configuration of a first embodiment of a Fourier transform arithmetic unit in accordance with the present invention. In this embodiment, a distribution switch 31-1 of a processing circuit forming an initial stage divides input data into first-half data preceding with respect to time and second-half data following the first-half data. The first-half data is supplied to a delay circuit 32A-1 via a second input terminal of a change-over switch 36A-1. An output from the delay circuit 32A-1 obtained by delaying the data by N/2 (N:the number of data items of one symbol) is again input to the delay circuit 32A-1 via a first input terminal of the change-over switch 36A-1.

Similarly, the second-half data distributed by the distribution switch 31-1 is input to a delay circuit 32B-1 via a first input terminal of a change-over switch 36B-1. The data output from the delay circuit 32B-1 after being delayed by N/2 by this circuit is again input to the delay circuit 32B-1 via a second input terminal of the change-over switch 36B-1.

A butterfly operation device 34-1 fetches the data output from the delay circuit 32A-1 and the data output from the change-over switch 36B-1, performs a butterfly operation using these groups of data and outputs the result of this operation to a multiplier 33-1 for the twiddle factors. The multiplier 33-1 performs multiplication of the input data with respect to the twiddle factors and outputs the result of this multiplication to a processing circuit forming a subsequent stage.

Processing circuits forming the second and other subsequent processing stages are arranged in the same manner as the first-stage processing circuit. However, the delay time of the delay circuits in each of the subsequent processing stages is ½ of that in the preceding stage.

The operation of this embodiment will next be described with reference to FIG. 2. The distribution switch 31-1 divides input data corresponding to each of unit symbols into first-half data and second-half data (FIG. 2(A)), supplies the first-half data to the second input terminal of the change-over switch 36A-1 (FIG. 2(B)) and supplies the second-half data to the first input terminal of the change-over switch 36B-1 (FIG. 2(C)).

The data input to the change-over switch 36A-1 through the second input terminal of this switch is supplied and written to the delay circuit 32A-1. For example, as shown in FIG. 2(B), first-half data $f_0$ of a symbol f is written to the delay circuit 32A-1. After an elapse of a delay time corresponding to N/2, this data $f_0$ is read out from the delay circuit 32A-1 to be supplied to the first input terminal of the butterfly operation device 34-1.

Second-half data $f_1$ distributed by the distribution switch 31-1 is input to the change-over switch 36B-1 through the first input terminal of this switch by the same timing as data $f_0$ supplied to the first input terminal of the butterfly operation device 34-1. Second-half data $f_1$ is thereby supplied to the second input terminal of the butterfly operation device 34-1. The butterfly operation device 34-1 performs one of two necessary operations, e.g., addition ($f_0+f_1$) with respect to first-half data $f_0$ and second-half data $f_1$ simultaneously input to its two input terminals and outputs the result of this operation (FIG. 2(F)).

While a sequence of operation of first-half data $f_0$ is being performed by the butterfly operation device 34-1, first-half data $f_0$ read out from delay circuit 32A-1 is again written to the delay circuit 32A-1 via the first input terminal of the change-over switch 36A-1 (FIG. 2(D)). Similarly, second-half data $f_1$ output from the change-over switch 36B-1 is written to the delay circuit 32B-1 (FIG. 2(E)) while the operation of this data is being performed by the butterfly operation device 34-1. When the butterfly operation device 34-1 finishes the addition of first-half data $f_0$ and second-half data $f_1$, first-half data $f_0$ is again output from the delay circuit 32A-1 and second-half data $f_1$ is read out from the delay circuit 32B-1. These first-half data $f_0$ and second-half data $f_1$ are output through the change-over switch 36B-1. Thus, the same data is again input to the butterfly operation device 34-1.

The butterfly operation device 34-1 performs the other of its operations not performed at the preceding time, e.g., subtraction ($f_0-f_1$) of first-half data $f_0$ and second-half data $f_1$ again input and outputs the result of this operation.

When first-half data f0 is being read out from the delay circuit 32A-1, first-half data $g_0$ of the next symbol g is supplied from the distribution switch 31-1 and written to the delay circuit 32A-1 via the second input terminal of the change-over switch 36A-1. Thus, butterfly operation can be performed continually with respect to the data of input symbols.

The result of the butterfly operation performed by the butterfly operation device 34-1 is input to the multiplier 33-1 for the twiddle factors. After undergoing multiplication for the twiddle factors, the operation result is output to the processing circuit forming the subsequent stage.

Similar processing is performed in the processing circuits forming the second and other subsequent stages.

In this embodiment, as described above, a butterfly operation is performed in the butterfly operation device 34-1 in a time division manner. It is sufficient for the butterfly operation device 34-1 to perform one operation (addition or subtraction) at a time. Therefore, the scale of the circuit of the present invention can be reduced in comparison with the circuit arranged to perform two operations (both addition and subtraction) at a time. The number of delay circuits in this embodiment is 2(N−1).

Figure 3:
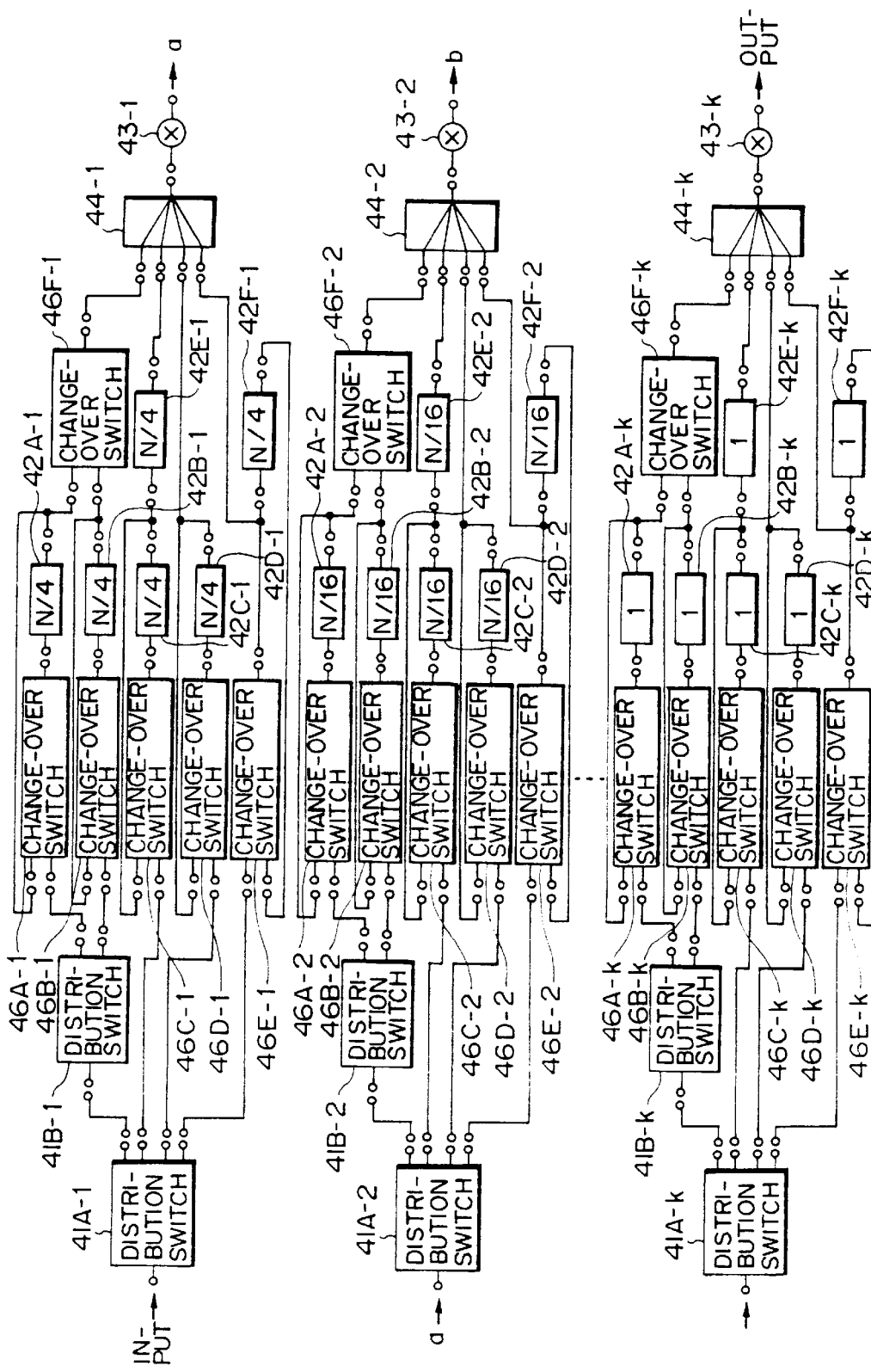
FIG. 3 is a block diagram showing the configuration of a second embodiment of the Fourier transform arithmetic unit of the present invention.

FIG. 3 shows the configuration of another embodiment of the present invention in which a radix-4 operation relating to the radix-2 operation of the embodiment of the radix-2 operation shown in FIG. 1 is performed. In this embodiment, a distribution switch 41A-1 divides input data into quarters and outputs the divided data through its first to fourth output terminals. It is necessary for the data output from the first output terminal of the distribution switch 41A-1 to be delayed by a total of 3N/4 before being supplied to a first input terminal of a butterfly operation device 44-1. It is necessary for the data output from the second output terminal to be delayed by N/2 before being supplied to a second input terminal of the butterfly operation device 44-1. It is necessary for the data output from the third output terminal to be delayed by N/4 before being supplied to a third input terminal of the butterfly operation device 44-1. Finally, it is necessary for the data output from the fourth output terminal to be supplied to the fourth input terminal of the butterfly operation device 44-1 without being specially delayed.

Therefore, the data output from the first output terminal of the distribution switch 41A-1 in a processing circuit forming an initial stage is supplied to a second input terminal of a change-over switch 46A-1 or to a second input terminal of a changeover switch 46B-1 via a first or second output terminal of a distribution switch 41B-1.

The change-over switch 46A-1 selects one of an output from a delay circuit 42A-1 which delays data by N/4 and an output from a first output terminal of the distribution switch 41B-1, and supplies the selected data to the delay circuit 42A-1. The change-over switch 46B-1 selects one of an output from a delay circuit 42B-1 which delays data by N/4 and an output from a second output terminal of the distribution switch 41B-1, and outputs the selected data to the delay circuit 42B-1. A change-over switch 46F-1 selects one of an output from a delay circuit 42A-1 and an output from the delay circuit 42B-1 and supplies the selected data to the first input terminal of the butterfly operation device 44-1.

A change-over switch 46C-1 selects one of the data output from the second output terminal of the distribution switch 41A-1 and an output from a delay circuit 42C-1 which delays data by N/4. The change-over switch 46C-1 outputs the selected data to the delay circuit 42C-1. A delay circuit 42E-1 delays an output from the delay circuit 42C-1 and supplies the delayed data to the second input terminal of the butterfly operation device 44-1.

A change-over switch 46D-1 selects one of the data output from the third output terminal of the distribution switch 41A-1 and data output from a delay circuit 46D-1 which delays data by N/4. The change-over switch 46D-1 supplies the selected data to the delay circuit 46D-1. An output from the delay circuit 46D-1 is supplied to the third input terminal of the butterfly operation device 44-1.

A change-over switch 46E-1 selects one of the data output from the fourth output terminal of the distribution switch 41A-1 and data output from a delay circuit 42F-1 which delays data by N/4. The change-over switch 46E-1 supplies the selected data to the delay circuit 46D-1 and to the fourth input terminal of the butterfly operation device 44-1.

One output from the butterfly operation device 44-1 is input to a multiplier for the twiddle factors 43-1. After undergoing multiplication for the twiddle factors, the data is output to a processing circuit forming a subsequent stage.

Processing circuits forming the second and other subsequent stages are arranged in the same manner. However, the delay time of the delay circuits in each of the subsequent processing stages is ¼ of that in the preceding stage.

The operation of this arithmetic unit will next be described with reference to FIG. 4. The initial-stage distribution switch 41A-1 divides input data corresponding to each of unit symbols (FIG. 4(A)) into quarters. For example, the distribution switch 41A-1 divides a symbol f into first-quarter data $f_0$, second-quarter data $f_1$, third-quarter data $f_2$ and fourth-quarter data $f_3$. The distribution switch 41A-1 outputs these groups of data through its first to fourth output terminals (FIGS. 4(B) to 4(E)).

The data output from the first output terminal of the distribution switch 41A-1 is input to the distribution switch 41B-1 to be supplied to the change-over switch 46A-1 or to the change-over switch 46B-1. The distribution switch 41B-1 distributes input data to the change-over switch 46A-1 and to the change-over switch 46B-1 alternately with respect to unit symbols. For example, if the data of symbol f is supplied to the change-over switch 46A-1, the data of the next symbol g is output to the change-over switch 46B-1. The data of the next but one symbol h is again supplied to the change-over switch 46A-1.

For example, data $f_0$ of the first symbol f is supplied to the change-over switch 46A-1. The change-over switch 46A-1 supplies this data to the delay circuit 42A-1 to write the data to this delay circuit (FIG. 4(F)). Data $f_0$ written to the delay circuit 42A-1 is delayed by N/4 and then read out to be again input to the same delay circuit 42A-1 through the change-over switch 46A-1. When data $f_0$ is delayed by a total of 3N/4 by repeating this operation, it is supplied to the first input terminal of the butterfly operation device 44-1 through the change-over switch 46F-1.

Second-quarter data $f_1$ output from the second output terminal of the distribution switch 41A-1 is input and written to the delay circuit 42C-1 through the change-over switch 46C-1 (FIG. 4(H)). The delay circuit 42C-1 delays the input data by N/4 and outputs the delayed data. This data $f_1$ output from the delay circuit 42C-1 is again input and written to the delay circuit 42C-1 through the change-over switch 46C-1. This operation is repeatedly performed.

The delay circuit 42E-1 further delays by N/4 the data delayed by N/4 by the delay circuit 42C-1 and supplies the data to the second input terminal of the butterfly operation device 44-1 (FIG. 4(J)). Accordingly, data $f_1$ is input to the second terminal of the butterfly operation device 44-1 when data $f_0$ is input to the first input terminal of the butterfly operation device 44-1.

Third-quarter data $f_2$ output from the third output terminal of the distribution switch 41A-1 is input and written to the delay circuit 42D-1 via the second input terminal of the change-over switch 46D-1 (FIG. 4(I)). After being delayed by N/4 by the delay circuit 42D-1, data $f_2$ is again input to the delay circuit 42D-1 via the first input terminal of the change-over switch 46D-1 to be delayed. This operation is repeatedly performed.

As a result, data $f_2$ from the delay circuit 42D-1 is supplied to the third input terminal of the butterfly operation device 44-1 when data $f_0$ and data $f_1$ are supplied to the first and second input terminals of the butterfly operation device 44-1.

Fourth-quarter data $f_3$ output from the fourth output terminal of the distribution switch 41A-1 is written to the delay circuit 42F-1 via the first input terminal of the change-over switch 46E-1 (FIG. 4(K)) and is simultaneously supplied to the fourth input terminal of the butterfly operation device 44-1.

In the above-described manner, groups of data $f_0$ to $f_3$ as the quarters of symbol f are supplied to the first to fourth input terminals of the butterfly operation device 44-1 simultaneously with each other, data items in each group being input in serial order. The butterfly operation device 44-1 performs predetermined one of four butterfly operations which are to be performed with respect to the four groups of data $f_0$ to $f_3$, and outputs operation result $F_0$ (FIG. 4(L)).

Data $f_0$ is again supplied from the delay circuit 42A-1 to the first input terminal of the butterfly operation device 44-1 through the change-over switch 46F-1 at the time of the next input subsequent to the time when the butterfly operation device 44-1 finishes outputting the operation result $F_0$ (FIG. 4(F)). Similarly, data $f_1$ is supplied from the delay circuit 42E-1 to the second input terminal (FIG. 4(J)), data $f_2$ is supplied from the delay circuit 42D-1 to the third input terminal (FIG. 4(I)) and data $f_3$ is supplied from the delay circuit 42F-1 to the fourth input terminal via the change-over switch 46E-1 (FIG. 4(K)).

Then the butterfly operation device 44-1 performs the second one of the four butterfly operations and outputs operation result $F_1$ (FIG. 4(L)).

When the second operation result $F_1$ is completed by the same operation, data $f_0$ and data $f_3$ are again input to the first to fourth input terminals of the butterfly operation device 44-1. The butterfly operation device 44-1 then outputs operation result $F_2$ of the third butterfly operation. When outputting operation result $F_2$ is completed, data $f_0$ to data $f_3$ are again input to undergo the fourth butterfly operation, thereby outputting operation result $F_3$.

When the butterfly operation device 44-1 finishes outputting the first operation result $F_0$ of symbol f, groups of data $g_0$ to $g_3$ as the quarters of the next symbol g are successively output from the first to fourth output terminals of the distribution switch 41A-1, one preceding the next by N/4.

The first data $g_0$ cannot be supplied and written to the delay circuit 42A-1. That is, it is still necessary for the delay circuit 42A-1 to hold data $f_0$ and to supply this data to the butterfly operation device 44-1. Therefore, the distribution switch 41B-1 supplies data $g_0$ to the delay circuit 42B-1 through the change-over switch 46B-1, thereby writing the data to the delay circuit 42B-1 (FIG. 4(G)). The delay circuit 42B-1 delays the input data $g_0$ by N/4 and outputs the delayed data. This delayed data $g_0$ is again input to the delay circuit 42B-1 through the change-over switch 46B-1 to be delayed. This operation is repeatedly executed.

When the last quarter data $g_3$ of symbol g is output from the fourth output terminal of the distribution switch 41A-1 and input to the fourth input terminal of the butterfly operation device 44-1, data $g_0$ read out from the delay circuit 42B-1 is supplied to the first input terminal of the butterfly operation device 44-1 through the change-over switch 46F-1. Similarly, at this time, data $g_1$ and data $g_2$ output from the second and third output terminals of the distribution switch 41A-1 are read out from the delay circuit 42E-1 and the delay circuit 42D-1 to be supplied to the second and third input terminals of the butterfly operation device 44-1. The butterfly operation device 44-1 then performs the first one of the butterfly operations with respect to the input data $g_0$ and $g_3$ and outputs operation result $G_0$ (FIG. 4(L)).

Subsequently, the butterfly operations are performed in the time division manner to output operation results.

The data output from the butterfly operation device 44-1 is input to the multiplier 43-1 for the twiddle factors. After undergoing multiplication for twiddle factors, the data is output to the processing circuit forming the subsequent stage.

Processing similar to that of the first-stage processing circuit is performed in each of the second-stage and other subsequent processing circuits.

The number of delay circuits in this embodiment is 2(N−1).

Figure 5:
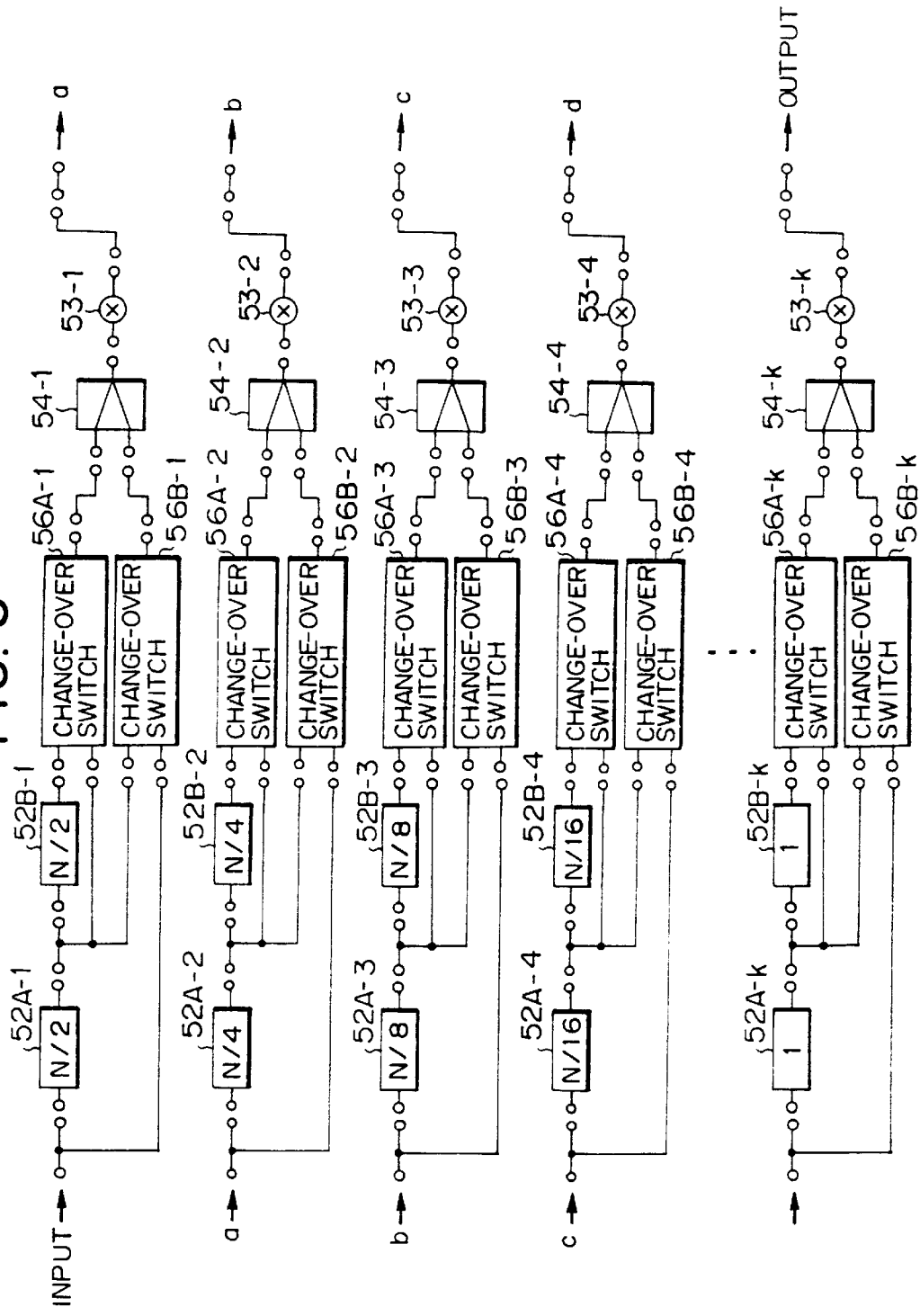
FIG. 5 is a block diagram showing the configuration of a third embodiment of the Fourier transform arithmetic unit of the present invention.

FIG. 5 shows a third embodiment of the present invention in which radix-2 fast Fourier transform is performed. In this embodiment, no distribution switch corresponding to the distribution switch 31-1 of the embodiment shown in FIG. 1 is used and input data is successively delayed by delay circuits 52A-1 and 52B-1 instead of being distributed by a distribution switch before it is input to a first input terminal of a change-over switch 56A-1. Each of the delay circuits 52A-1 and 52B-1 delays the data by N/2. An output from the delay circuit 52A-1 is supplied to a second input terminal of the change-over switch 56A-1.

The output from the delay circuit 52A-1 is also supplied to a first input terminal of a change-over switch 56B-1. Data input to an input terminal of the delay circuit 52A-1 is supplied to a second input terminal of the change-over switch 56B-1. Data selected by the change-over switches 56A-1 and 56B-1 is supplied to first and second input terminals of a butterfly operation device 54-1. An output from the butterfly operation device 54-1 undergoes operation for the twiddle factors performed by an operation device 53-1 and is thereafter output to a processing circuit forming a subsequent stage.

Processing circuits forming the second and other subsequent stages are arranged in the same manner as the initial-stage processing circuit. However, the delay time of the delay circuits in each of the subsequent processing stages is ½ of that in the preceding stage.

The operation of this embodiment will next be described with reference to FIG. 6. If, for example, data of a symbol f (FIG. 6(A)) is input, first-half data $f_0$ delayed by N/2 by the delay circuit 52A-1 is supplied to the second input terminal of the change-over switch 56A-1 (FIG. 6(B)). On the other hand, second-half data $f_1$ is supplied to the second input terminal of the change-over switch 56B-1 (FIG. 6(A)). Then, as shown in FIG. 7, each of the change-over switches 56A-1 and 56B-1 is changed to the lower position as seen in the figure to supply first-half data $f_0$ to the first input terminal of the butterfly operation device 54-1 (FIG. 6(D)) and to simultaneously supply second-half data $f_1$ to the second input terminal of the butterfly operation device 54-1 (FIG. 6(E)). The butterfly operation device 54-1 performs the first one of two butterfly operations, e.g., addition and outputs the value of the addition result $(f_0+f_1)$ (FIG. 6(F)).

Next, the change-over switches 56A-1 and 56B-1 are changed to the upper positions as seen in the figure. The change-over switch 56A-1 thereby fetches first-half data $f_0$ delayed by a total of N by the delay circuits 52A-1 and 52B-1 (FIG. 6(C)). Also, the change-over switch 56B-1 fetches second-half data $f_1$ delayed by N/2 by the delay circuit 52A-1 (FIG. 6(B)). The butterfly operation device 54-1 performs the other butterfly operation not performed at the preceding time, e.g., subtraction and outputs the value of the subtraction result $(f_0-f_1)$ (FIG. 6(F)).

Similar processing is performed in the processing circuits forming the second and other subsequent stages.

Figure 8:
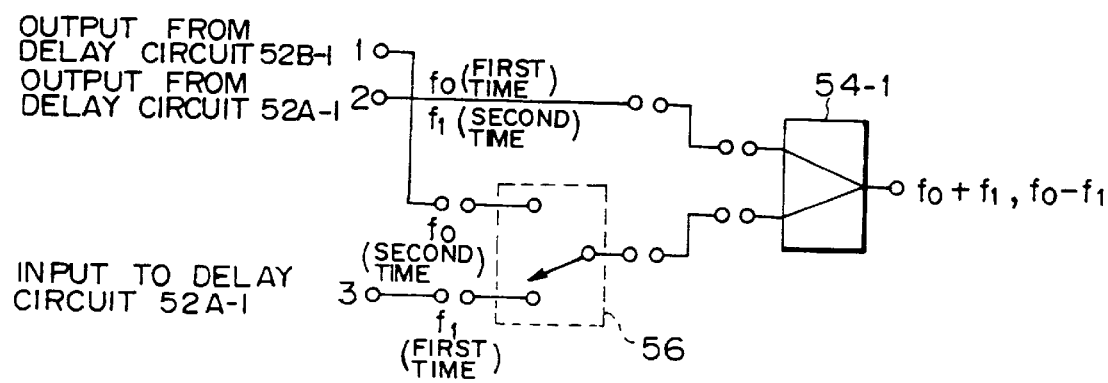
FIG. 8 is a block diagram showing the configuration of a Fourier transform arithmetic unit in accordance with a seventh embodiment of the present invention.

The embodiment shown in FIG. 5 may alternatively be such that, for example, as shown in FIG. 8, only one change-over switch 56 is provided in one stage, the output of the delay circuit 52B-1 is supplied to the first input terminal of the change-over switch 56, the output of the delay circuit 52A-1 is supplied directly to the first input terminal of the butterfly operation device 54-1, and the data supplied to the input terminal of the delay circuit 52A-1 is supplied to the second input terminal of the change-over switch 56. (The processing circuits of the other stages are arranged in the same manner.)

In such a case, when first-half data $f_0$ is supplied for the first time from the delay circuit 52A-1 to the first input terminal of the butterfly operation device 54-1, second-half data $f_1$ is supplied for the first time to the second input terminal of the butterfly operation device 54-1 via the second input terminal of the switch 56. The butterfly operation device 54-1 performs the predetermined one of the butterfly operations (e.g., addition $(f_0+f_1)$) with respect to these groups of data.

Next, when second-half data $f_1$ is supplied for the second time from the delay circuit 52A-1 to the first input terminal of the butterfly operation device 54-1, first-half data $f_0$ delayed by the delay circuit 52B-1 is supplied for the second time to the second input terminal of the butterfly operation device 54-1 through the switch 56. The butterfly operation device 54-1 performs the other butterfly operation not performed at the preceding time (e.g., subtraction $(f_0-f_1)$) and outputs the operation result.

Figure 9:
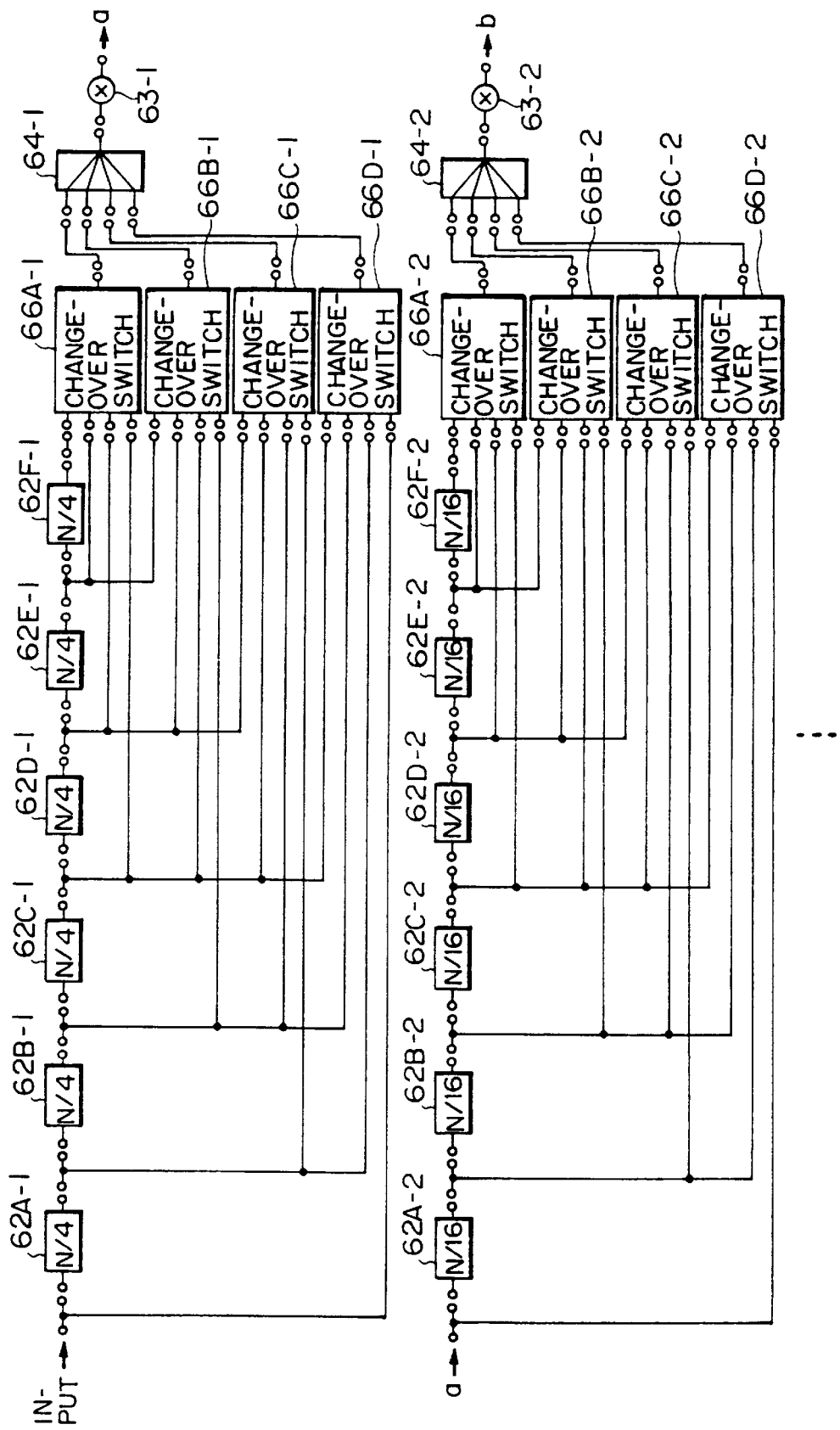
FIG. 9 is a block diagram showing the configuration of a fourth embodiment of the Fourier transform arithmetic unit of the present invention.

FIG. 9 shows the configuration of a fourth embodiment of the present invention relating to the radix-2 embodiment shown in FIG. 5 but arranged to perform radix-4 processing. In an initial-stage processing circuit of this embodiment, input data is successively delayed by delay circuits 62A-1 to 62F-1, each delay circuit delaying the data by N/4. The input data is thereby delayed by a total of 3N/2 and is supplied to a first input terminal of a change-over switch 66A-1. An output from the delay circuit 62E-1 is supplied to a second input terminal of the change-over switch 66A-1 and to a first input terminal of a change-over switch 66B-1. An output from the delay circuit 62D-1 is supplied to each of a third input terminal of the change-over switch 66A-1, a second input terminal of the change-over switch 66B-1 and a first input terminal of a change-over switch 66C-1.

An output from the delay circuit 62C-1 is supplied to each of a fourth input terminal of the change-over switch 66A-1, a third input terminal of the change-over switch 66B-1, a second input terminal of the change-over switch 66C-1 and a first input terminal of a change-over switch 66D-1.

An output from the delay circuit 62B-1 is supplied to each of a fourth input terminal of the change-over switch 66B-1, a third input terminal of the change-over switch 66C-1 and a second input terminal of the change-over switch 66D-1.

An output from the delay circuit 62A-1 is supplied to a fourth input terminal of the change-over switch 66C-1 and to a third input terminal of the change-over switch 66D-1. Data input to an input terminal of the delay circuit 62A-1 is supplied to the fourth input terminal of the change-over switch 66D-1.

Outputs from the change-over switches 66A-1 to 66D-1 are respectively supplied to first to fourth input terminals of a butterfly operation device 64-1. An output from the butterfly operation device 64-1 is supplied to a multiplier 63-1 for the twiddle factors. An output from the multiplier 63-1 for the twiddle factors is input to a processing circuit forming a subsequent stage.

Processing circuits forming the second and other subsequent stages are arranged in the same manner. However, the delay time of the delay circuits in each of the subsequent processing stages is ¼ of that in the preceding stage.

In this embodiment, data is supplied to the first to fourth input terminals of the change-over switch 66A-1 at different times successively shifted by a N/4 step by the delay circuits 62F-1, 62E-1, 62D-1, and 62C-1. Similarly, to the first to fourth input terminals of the change-over switches 66B-1, 66C-1, and 66D-1, data is supplied at different times successively shifted by a N/4 step.

Also, the groups of data are respectively input to the change-over switches 66A-1, 66B-1, 66C-1, and 66D-1 at different times relatively shifted by N/4. Therefore, each of the change-over switches 66A-1 to 66D-1 selects, for example, the input to its fourth input terminal to enable groups of data corresponding to the quarters of one symbol to be supplied to the first to fourth input terminals of the butterfly operation device 64-1 simultaneously with each other. At this time, the butterfly operation device 64-1 performs the first one of necessary butterfly operations.

When the inputs to the third input terminals of the change-over switches 66A-1 to 66D-1 are next selected, the same data as those selected at the preceding time are again supplied to the first to fourth input terminals of the butterfly operation device 64-1. At this time, the butterfly operation device 64-1 performs the second one of the butterfly operations.

Subsequently, in the same manner, the change-over switches 66A-1 to 66D-1 are operated to select the data supplied to the second input terminals and are then operated to select the data supplied to the third input terminals. In each case, the butterfly operation device 64-1 performs another of the butterfly operations.

The number of delay circuits in this embodiment is also 2(N−1).

Operations for fast Fourier transform can be performed by each of the circuit arrangements described above as embodiments of the present invention. Each of the above-described Fourier transform arithmetic units can be applied to an apparatus such as that shown in FIG. 10, for example.

Figure 10:
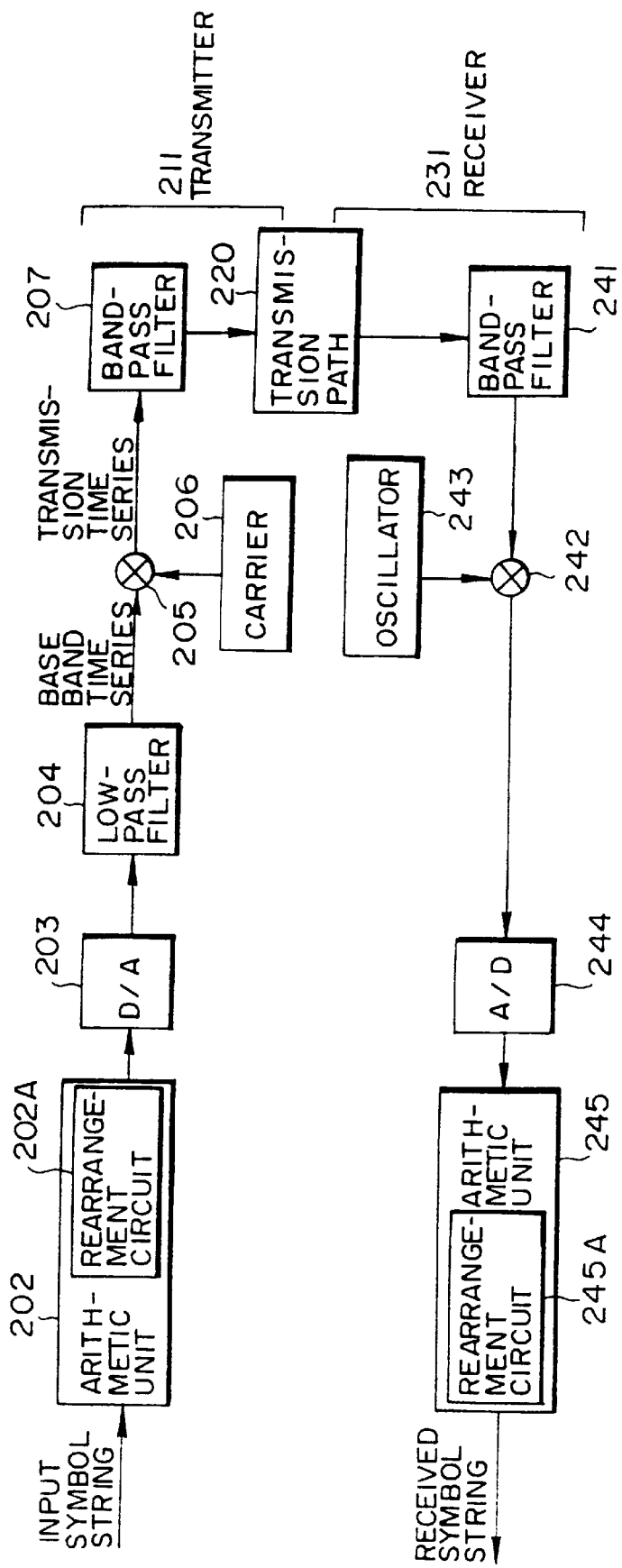
FIG. 10 is a block diagram showing the configuration of an example of an OFDM (orthogonal frequency division multiplex) transmitting and receiving system to which the Fourier transform arithmetic unit of the present invention is applied.
Figure 11:
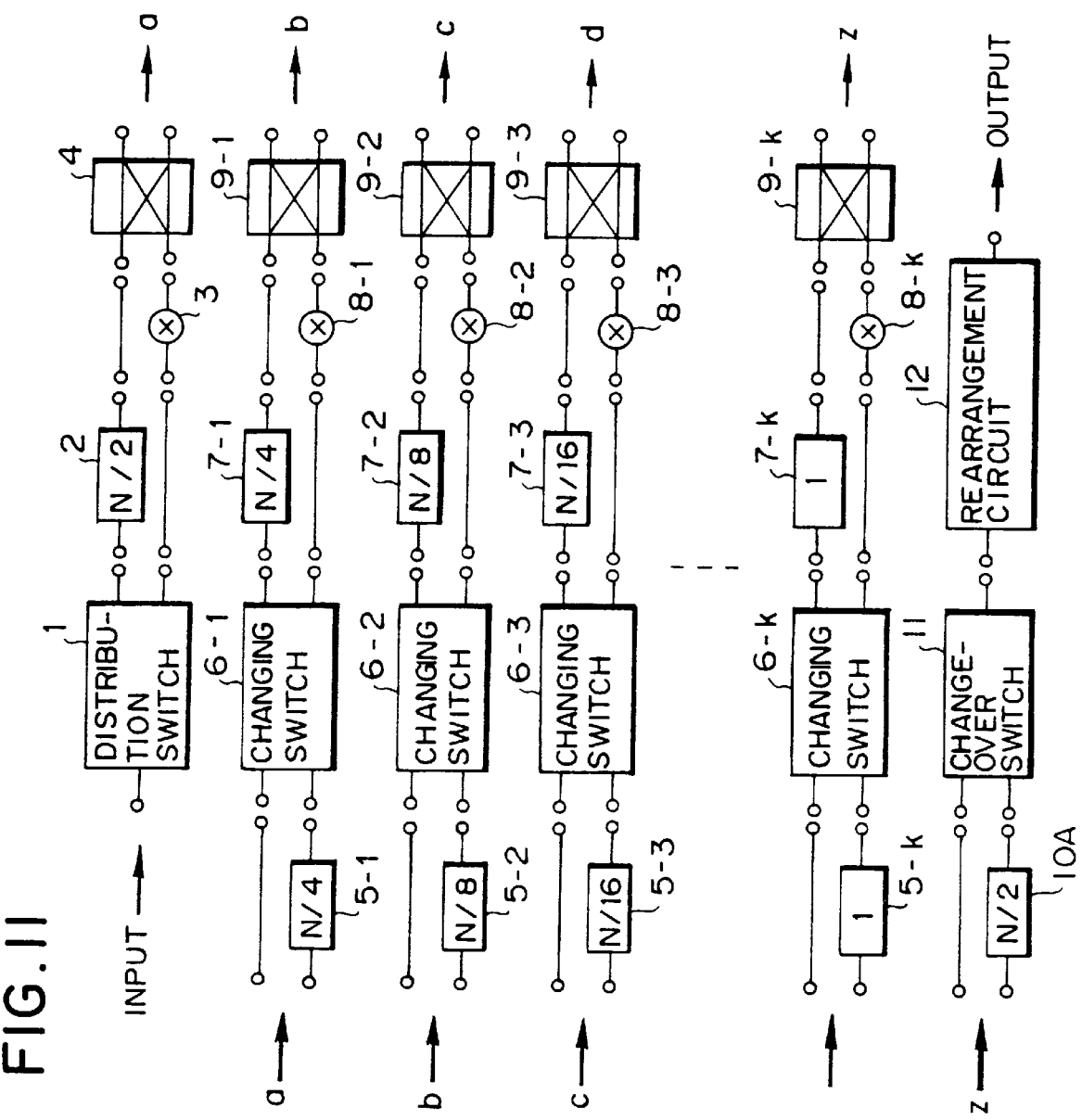
FIG. 11 is a block diagram showing the configuration of an example of a Fourier transform arithmetic unit.
Figure 12:
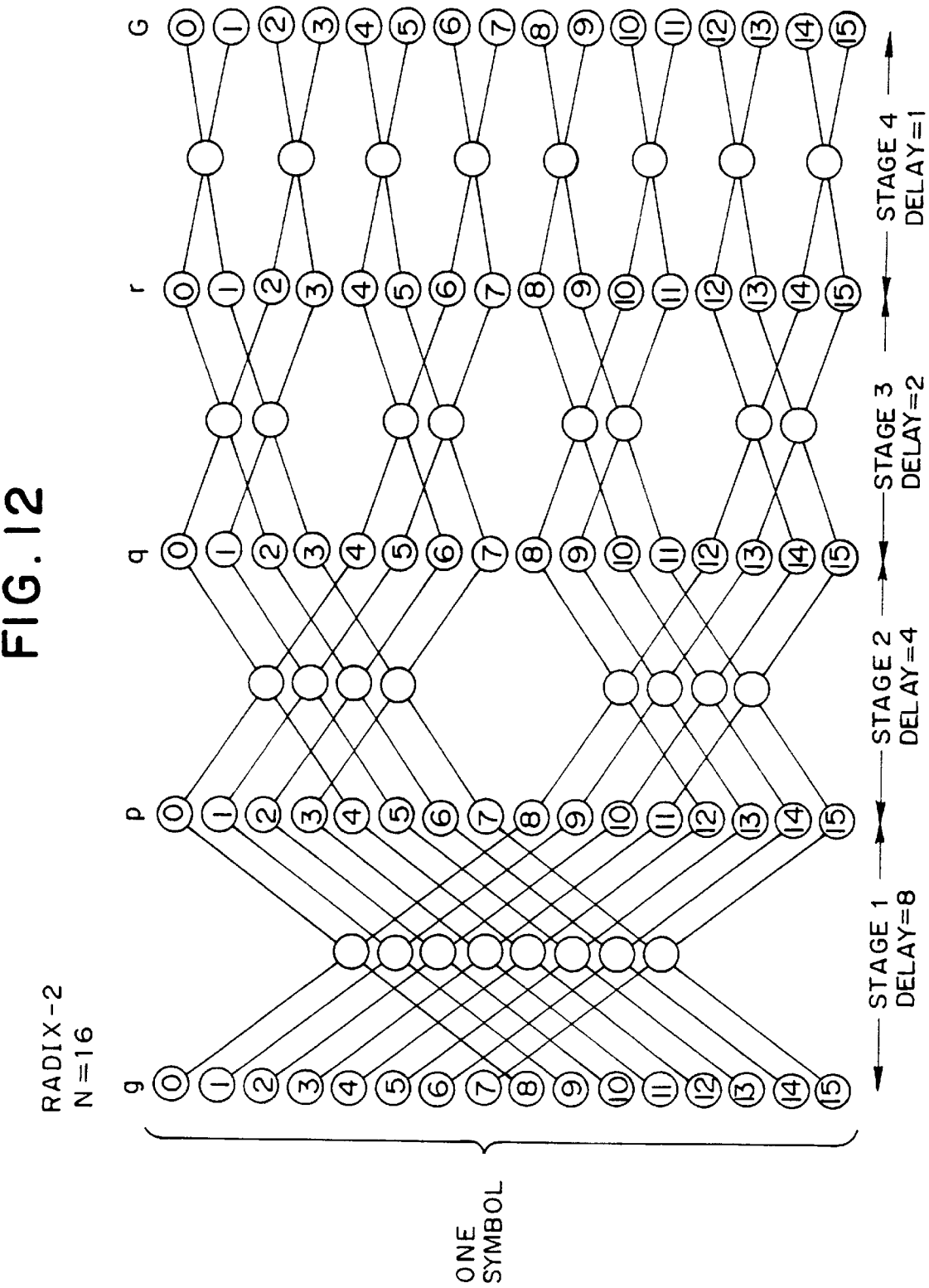
FIG. 12 is a diagram of an algorithm for a radix-2 fast Fourier transform.
Figure 13:
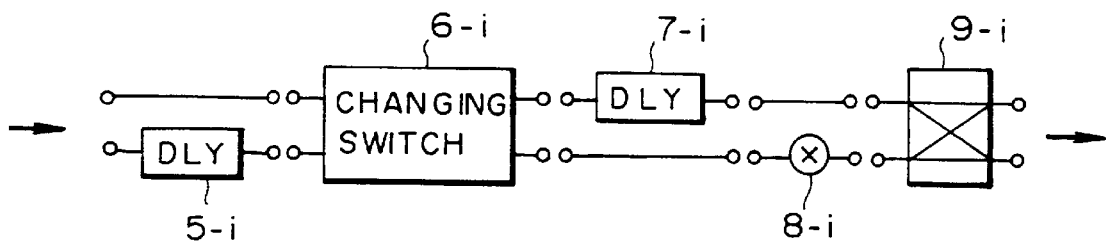
FIG. 13 is a diagram showing the inserted position of the multiplier for the twiddle factors in the example shown in FIG. 11.
Figure 14:
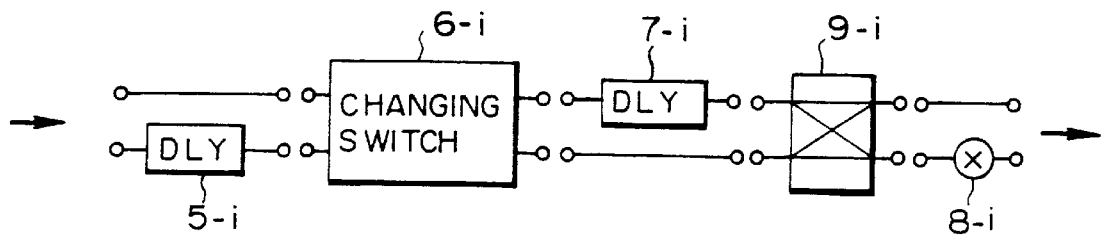
FIG. 14 is a diagram showing another example of the inserted position of the multiplier for the twiddle factors.
Figure 15:
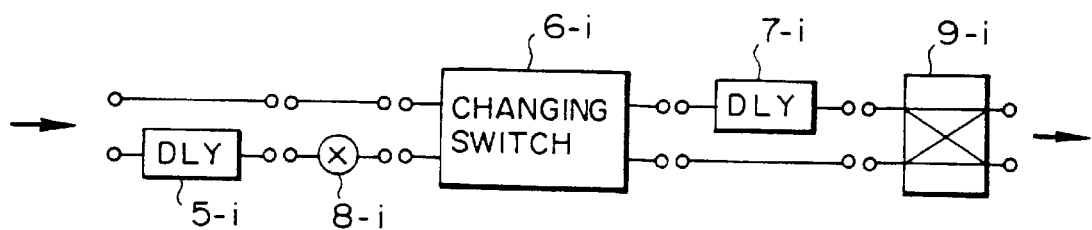
FIG. 15 is a diagram showing still another example of the inserted position of the multiplier for the twiddle factors.
Figure 16:
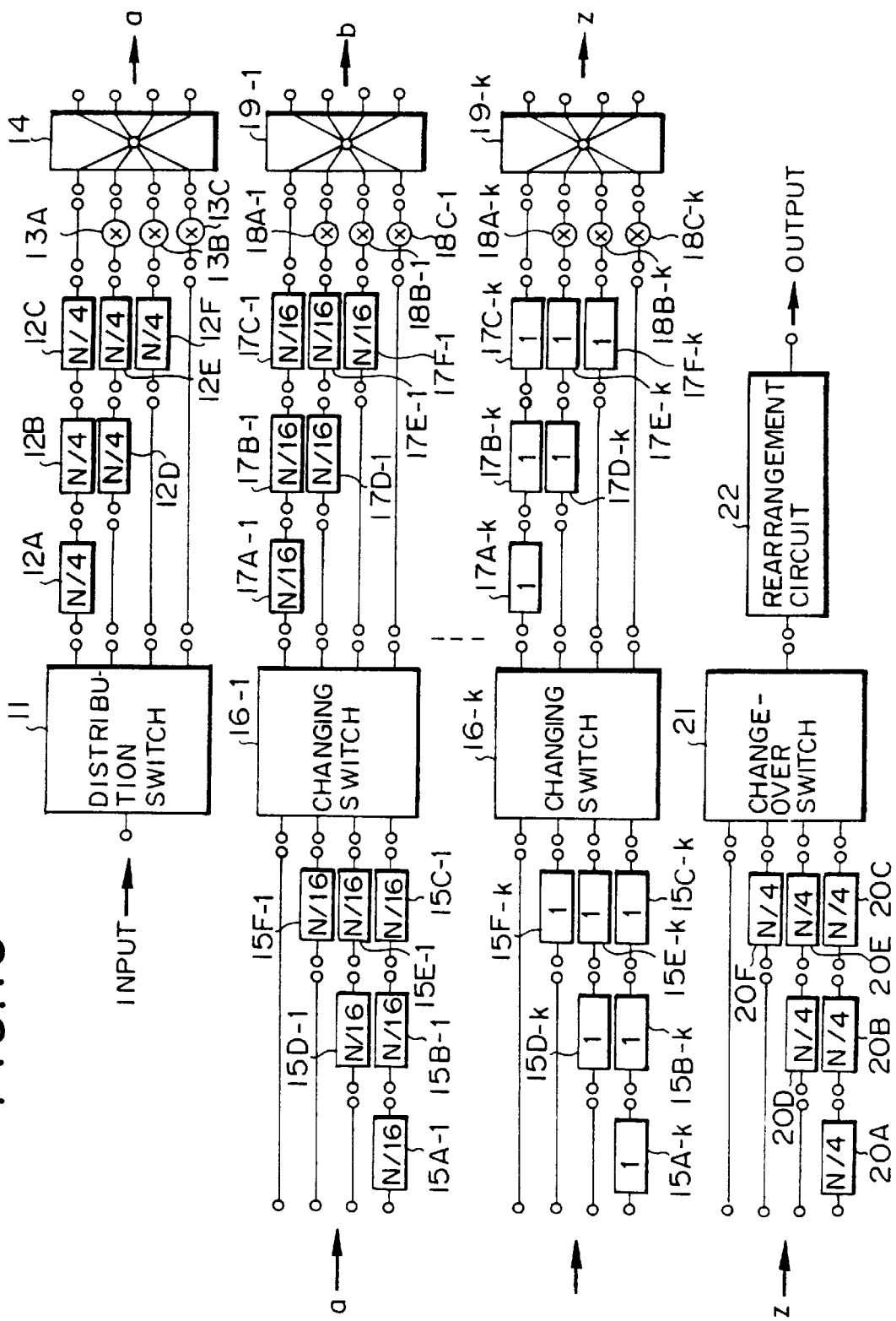
FIG. 16 is a block diagram showing the configuration of another example of the Fourier transform arithmetic unit.
Figure 17:
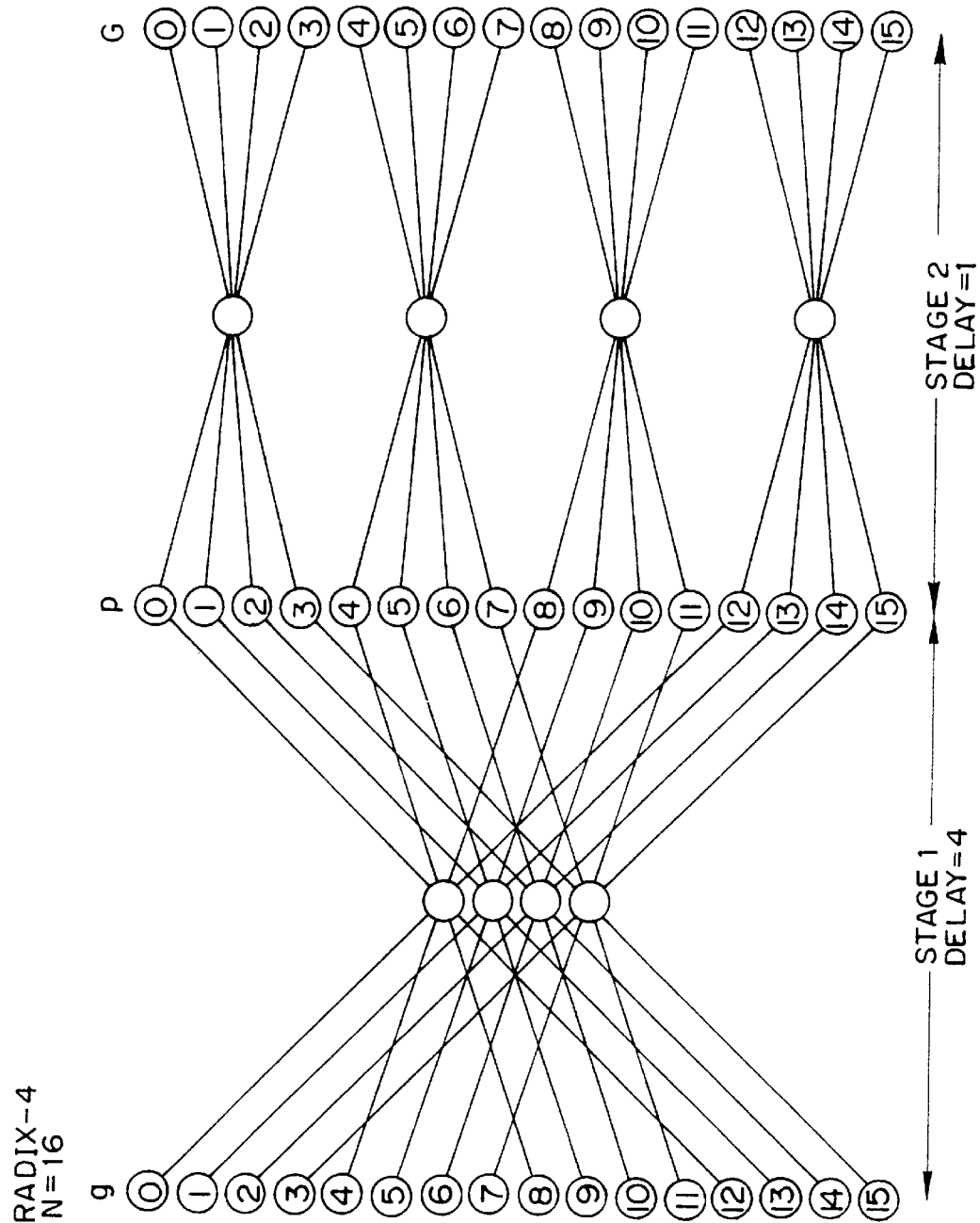
FIG. 17 is a diagram of an algorithm for fast Fourier transform in a case where the radix is 4.

FIG. 10 shows an orthogonal frequency division multiplex (OFDM) transmitting and receiving system, which is basically formed of a transmitter 211 and a receiver 231 which receives data transmitted from the transmitter 211 via a transmission path 220.

In the transmitter 211, an input symbol string is supplied to an arithmetic unit 202 containing a circuit for inverse fast Fourier transform (inverse FFT) of a pipeline type such as one of those described above. Inverse FFT can be realized by an arrangement which is basically equal to that for FFT, and which is modified only by changing the coefficients of multiplications in the multipliers for the twiddle factors from the corresponding coefficients in FFT if the radix is 2. If radix is larger than 2, the arrangement can readily be modified by providing a change-over switch in an input or output section for each butterfly operation device together with changing the multiplication factors.

In this arithmetic unit 202, a rearrangement circuit 202A for rearranging outputs from the above-mentioned pipeline type inverse FFT circuit is incorporated. When the rearrangement circuit 202A is supplied with data, e.g., data items G0 to G15 input successively, it outputs data items, G0, G8, G4, G12, G2, G10, G6, G14, G1, G9, G5, G13, G3, G11, G7, and G15 in this order.

This output order is determined by bit reverse. That is, if the numbers 0 to 15 indicating the order of data items G0 to G15 are expressed by binary notation, they are 0000, 0001, 0010, . . ., 1111. From these binary numbers, binary numbers are obtained by taking the numerals not from the most significant bit but from the least significant bit (bit reversing). The obtained binary numbers express the output order.

The arithmetic unit 202 processes the input symbol string by inverse FFT. The number of points of this inverse FFT is the same as the number of carriers of the input transmitted data modulated by quadrature phase shift keying (QPSK). Inverse FFT can be regarded as transform from a frequency region to a time region.

The output from the arithmetic unit 202 is input to a D/A converter circuit 203 to be converted from digital form into analog form. The output from the D/A converter 203 is input to a low-pass filter 204 to extract a time series signal in a base band. This signal is input to a multiplier 205 and is multiplied by a carrier output from a carrier generating circuit 206 to be converted into a radio frequency signal at a desired frequency. From this radio frequency signal, a signal in a predetermined pass band is extracted by a band-pass filter 207 to be transmitted through the transmission path 220.

In the receiver 231, only the signal in the predetermined band is extracted from the signal supplied from the transmission path 220 by a band-pass filter 241 and is supplied to a multiplier 242. The multiplier 242 multiplies the input signal by a signal at the predetermined frequency output from an oscillator 243 to obtain base band signal components. An A/D converter circuit 244 converts the output from the multiplier 242 from analog form into digital form, and outputs the converted signal to an arithmetic unit 245 in which the above-described pipeline type FFT circuit and a rearrangement circuit 245A for rearranging the output from the FFT circuit are incorporated.

The arithmetic unit 245 processes the input data by FFT processing. FFT processing can be regarded as transform from a time region to a frequency region.

Each of the rearrangement circuits 202A and 245A may be provided in an input section of the pipeline type FFT circuit instead of being provided in an output section. In such a case, the delay time in the processing circuits forming a certain number of processing stages is set in such a manner as to be shortest in the initial stage and to be longer in each subsequent stage than in the preceding stage.

Thus, an OFDM transmitting and receiving system can be realized in which the interval of symbols (symbol value) is increased so that system is not easily affected by a delay time due to reflected waves, and which is therefore strong against multipath interference.

In the above-described embodiments, delay circuits and change-over switches are provided in a stage in front of a butterfly operation device and are arranged so that substantially the same data is input to the butterfly operation device a certain number of times. Such an arrangement can be realized as an arrangement other than those of the above-described embodiments. However, the arrangements of the above-described embodiment have a smaller number of delay circuits and correspondingly reduce the manufacturing cost and the size of the arithmetic unit.

What is claimed is:

1. A Fourier transform arithmetic unit having a plurality of processing stages for performing fast Fourier transform by pipeline processing, each of said plurality of processing stages comprising:

timing control means for dividing input data corresponding to one symbol into a plurality of groups of data forming a plurality of divided groups of data;

delay means for delaying each of said plurality of groups by a predetermined delay time, each of said groups having a same timing;

feedback means for outputting the plurality of divided groups of data a plurality of times, each of said times said plurality of divided groups are output having a same timing; and butterfly operation means supplied with the plurality of divided groups of data output said plurality of times having the same timing by said feedback means for performing a selected one of a plurality of operations each time the plurality of divided groups of data are output by the feedback means.

2. The arithmetic unit according to claim 1, wherein said butterfly operation means comprises first operation means and each of said plurality of processing stages further comprises multiplication means for multiplying twiddle factors with a result output from said first operation means.

3. The arithmetic unit according to claim 2, wherein said delay means has corresponding ones of a plurality of delay times set with respect to said plurality of processing stages, and wherein a delay time of the delay means of a kth processing stage is expressed by $N/R^k$ where N is a number of points of Fourier transform and R is a radix.

4. The arithmetic unit according to claim 3, wherein said timing control means includes means for dividing said input data corresponding to one symbol into R groups of data.

5. The arithmetic unit according to claim 4, wherein said feedback means includes means for outputting the plurality of groups of data R times having the same timing.

6. The arithmetic unit according to claim 1, wherein said timing control means comprises:

division means for dividing said input data corresponding to one symbol into said plurality of groups of data;

wherein said delay means comprises at least one group delay means provided in correspondence with each of the plurality of divided groups of data, the group delay means having a predetermined delay time.

7. The arithmetic unit according to claim 1, wherein said delay means comprises:

group delay means having a plurality of delay elements connected in series, each of said plurality of delay elements having a predetermined delay time; and selection means for selecting data from an input end and output end of said delay means and points of connection between said plurality of delay elements so that all the plurality of groups of data are output having the same timing.

8. A Fourier transform operation method of performing fast Fourier transform by pipeline processing using a plurality of processing stages, said method comprising, in each of said plurality of processing stages:

a first step of dividing input data corresponding to one symbol into a plurality of groups of data forming a plurality of divided groups of data;

a second step of delaying the plurality of divided groups of data by a predetermined length of time so that the divided groups of data have a same timing;

a third step of feeding back said delayed divided groups of data having the same timing so that said divided groups of data are provided a plurality of times; and a fourth step of performing a selected one of a predetermined plurality of butterfly operations each time the plurality of groups of data are supplied having the same timing, and outputting a result of the butterfly operations.

9. The method according to claim 8, further comprising, in each of said plurality of processing stages, a fifth step of performing multiplication of twiddle factors with the result of the operation performed in said fourth step.

10. The method according to claim 9, wherein in said second step said predetermined length of time is expressed by $N/R^k$ where N is a number of points of a Fourier transform and R is a radix.

11. The method according to claim 10, wherein, in said first step, said input data corresponding to one symbol is divided into R groups of data.

12. The method according to claim 11, wherein, in said third step, the plurality of groups of data are output R times having the same timing.

13. The method according to claim 8, wherein said second step comprises:

supplying the data corresponding to one symbol to delay means having a plurality of delay elements connected in series, each of the plurality of delay elements having a predetermined delay time; and extracting data output from an input end and output end of the delay means and points of connection between the plurality of delay elements.

14. The method according to claim 13, wherein said second step comprises selecting the data extracted so that all the plurality of groups of data are output having the same timing.

* * * * *

UNITED STATES PATENT AND TRADEMARK OFFICE
CERTIFICATE OF CORRECTION

PATENT NO. : 5,805,485
DATED : 9/8/98
INVENTOR(S) : Ito et al.

It is certified that error appears in the above-identified patent and that said Letters Patent is hereby corrected as shown below:

Column 9, line 53, change "Fig. 2 is a diagram of" to --Figs. 2 (A) –2 (F) are diagrams explaining--;

Column 9, line 58, change "Fig. 4 is a diagram of" to --Figs. 4 (A) -4 (L) are diagrams explaining--.

Figure 6:
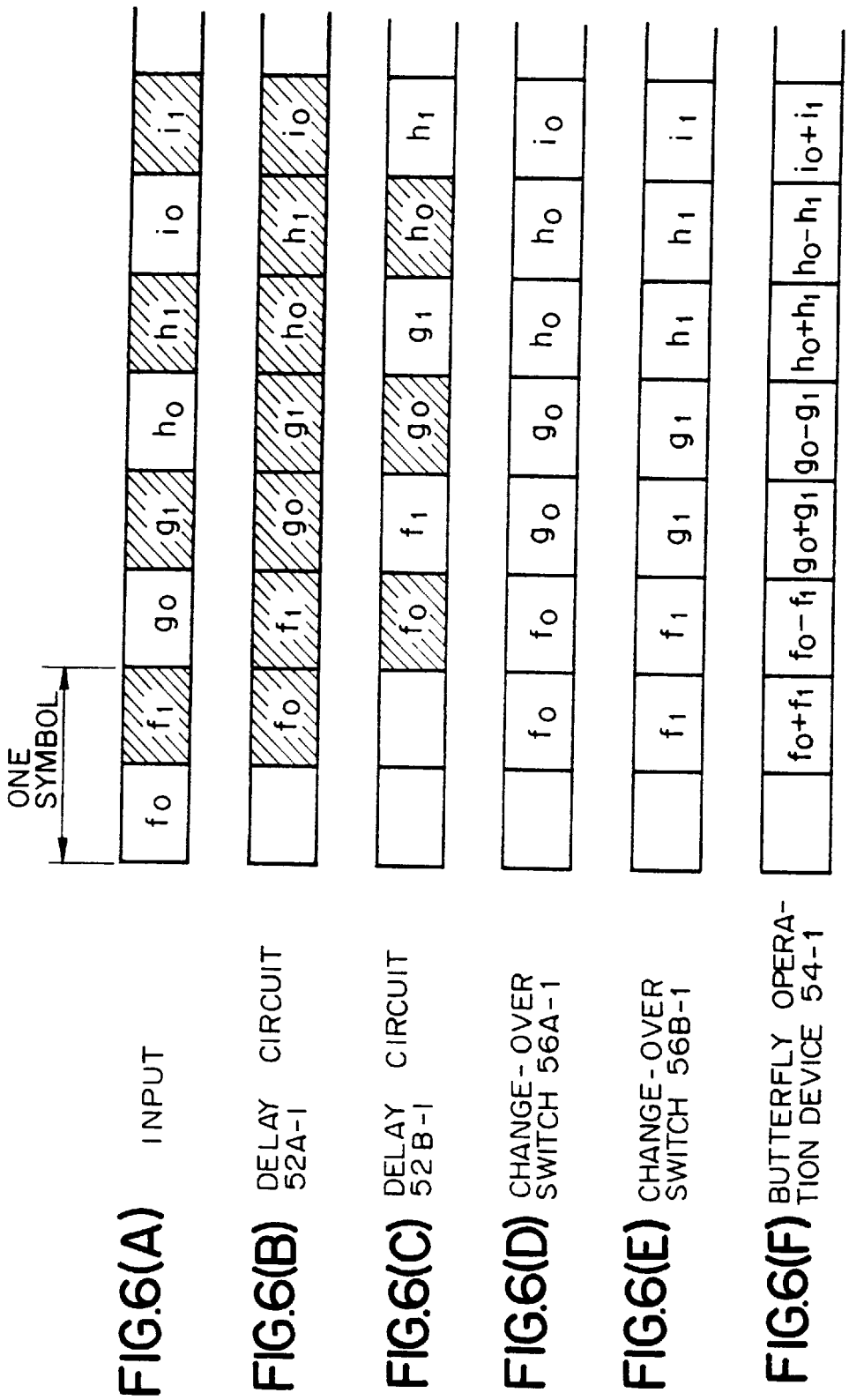
FIG. 6 is a diagram of the operation of the embodiment shown in FIG. 5.
Figure 7:
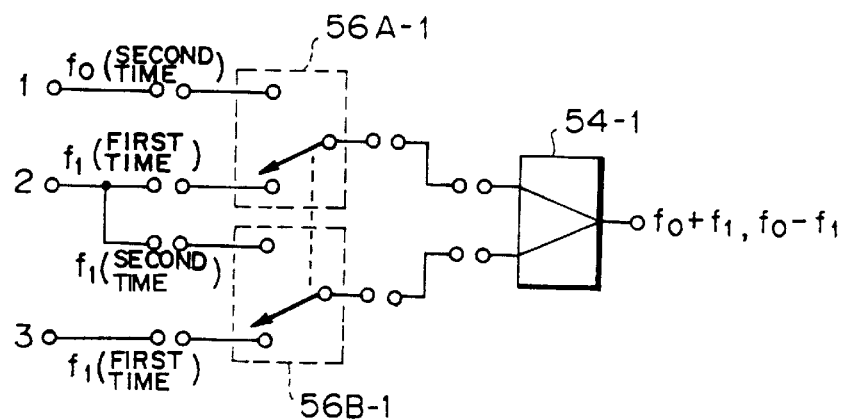
FIG. 7 is a diagram of the change-over operation of a change-over switch in the embodiment shown in FIG. 5.

Column 9, line 64, change "Fig 6. is a diagram of" to --Figs. 6 (A) – 6 (F) are diagrams explaining--.

Column 10, line 67, change "Fig. 2" to --Figs. 2 (A) –2 (F)--.

Column 13, line 4, change "Fig. 4" to --Figs. 4 (A) –4 (L)--.

Column 15, line 35, change "Fig. 6" to --Figs. 6 (A) –6 (F)--.

Signed and Sealed this

Twenty-third Day of February, 1999

Attest:

Q. TODD DICKINSON

*Attesting Officer*   *Acting Commissioner of Patents and Trademarks*